US012739917B2

(12) United States Patent
Vangala et al.

(10) Patent No.: US 12,739,917 B2
(45) Date of Patent: Sep. 15, 2026

(54) SYSTEMS AND METHODS FOR MULTI-HOP CONFIGURATIONS IN IAB NETWORKS FOR REDUCED LATENCY

(71) Applicant: APPLE INC., Cupertino, CA (US)

(72) Inventors: Sarma V. Vangala, Cupertino, CA (US); Fangli Xu, Beijing (CN); Haijing Hu, Cupertino, CA (US); Longda Xing, Cupertino, CA (US); Murtaza A. Shikari, Cupertino, CA (US); Sree Ram Kodali, Cupertino, CA (US); Srinivasan Nimmala, Cupertino, CA (US)

(73) Assignee: APPLE INC., Cupertino, CA (US)

( * ) Notice: Subject to any disclaimer, the term of this patent is extended or adjusted under 35 U.S.C. 154(b) by 1002 days.

(21) Appl. No.: 17/593,533

(22) PCT Filed: Oct. 22, 2020

(86) PCT No.: PCT/CN2020/122955

§ 371 (c)(1),
(2) Date: Sep. 20, 2021

(87) PCT Pub. No.: WO2022/082645

PCT Pub. Date: Apr. 28, 2022

(65) Prior Publication Data

US 2022/0312529 A1 Sep. 29, 2022

(51) Int. Cl.

*H04W 76/18* (2018.01)
*H04W 76/12* (2018.01)
*H04W 76/19* (2018.01)
*H04W 76/27* (2018.01)

(52) U.S. Cl.

CPC ........... *H04W 76/18* (2018.02); *H04W 76/12* (2018.02); *H04W 76/19* (2018.02); *H04W 76/27* (2018.02)

(58) Field of Classification Search

None

See application file for complete search history.

(56) References Cited

U.S. PATENT DOCUMENTS 12,483,956 B2 * 11/2025 Lu ........................ H04W 36/087
2016/0028625 A1 * 1/2016 Hari ........................ H04L 45/74
370/392

(Continued)

FOREIGN PATENT DOCUMENTS

CN 110475351 A 11/2019
CN 110636636 A 12/2019

(Continued)

OTHER PUBLICATIONS

Ericsson, "(TP for NR-IAB BL CR for TS 38.401): Backhaul Channel Setup and Modification Procedure for IAB Networks", R3-192165, 3GPP TSG RAN WG3 Meeting #103bis Xi'an, P.R. China, Agenda Item 13.2.1.2, Apr. 8-12, 2019, 3 pages.

(Continued)

*Primary Examiner* — Jeffrey M Rutkowski
*Assistant Examiner* — Mehedi S Aley
(74) *Attorney, Agent, or Firm* — Dorsey & Whitney LLP

(57) ABSTRACT

Multi-hop configurations in integrated Access and Backhaul (IAB) networks are provided for reduced latency. For modifications to a backhaul adaptation protocol (BAP) header supports faster data radio bearer (DRB) transmissions. Or, for both signaling radio bearer (SRB) and DRB flows, configuration forwarding may be used to reduce configuration latency wherein a single RRCReconfiguration message is forwarded to intermediate nodes that process the configuration and respond back independently. Alternatively, for both SRB and DRB flows, configuration multi-casting may (Continued)

be used for simultaneous IAB node and backup configurations. Methods are provided for fast activation of backup links in IAB nodes.

12 Claims, 15 Drawing Sheets

(56) References Cited

U.S. PATENT DOCUMENTS

| | | | | |
|---|---|---|---|---|
| 2019/0372903 | A1* | 12/2019 | Dress | H04L 49/201 |
| 2020/0084688 | A1 | 3/2020 | Mildh et al. | |
| 2020/0120725 | A1 | 4/2020 | Mildh et al. | |
| 2022/0014976 | A1* | 1/2022 | Luo | H04W 36/0044 |
| 2022/0286841 | A1* | 9/2022 | Mildh | H04W 8/26 |
| 2022/0369190 | A1* | 11/2022 | Diao | H04W 76/20 |
| 2023/0007562 | A1* | 1/2023 | Hasegawa | H04W 4/06 |
| 2023/0254729 | A1* | 8/2023 | Jia | H04W 28/0247 |
| 2023/0413127 | A1* | 12/2023 | Jia | H04W 36/0038 |

FOREIGN PATENT DOCUMENTS

| | | | | |
|---|---|---|---|---|
| CN | 110798902 | A * | 2/2020 | H04W 76/12 |
| CN | 111093286 | A | 5/2020 | |
| WO | 2019245423 | A1 | 12/2019 | |
| WO | 2020069158 | A1 | 4/2020 | |

OTHER PUBLICATIONS

Samsung, "(TP for NR-IAB BL CR for 38.473) Further discussion on IP address issues of IAB network", R3-200568 was R3-197126, 3GPP TSG-RAN WG3 Meeting #107-e, E-Meeting, Agenda Item 13.2.1.3 (IP Address Management), Feb. 24-Mar. 6, 2020, 45 pages.

Zte, "Discussion on backhaul bearer setup in IAB network", R3-185535, 3GPP TSG-RAN WG3 Meeting #101bis, Chengdu, China, Agenda Item 24.1.2.2, Oct. 8-12, 2018, 14 pages.

3GPP TS 38.340 , "3rd Generation Partnership Project; Technical Specification Group Radio Access Network; NR; Backhaul Adaptation Protocol (BAP) specification (Release 16)", V16.2.0, Sep. 2020, 22 pages.

Ericsson , "IAB Integration and Associated BH Bearer and BAP Handling", R2-1907008, 3GPP TSG-RAN WG2 Meeting # 106, Reno, Nevada, Agenda Item 11.1.3, May 13-17, 2019, 6 pages.

PCT/CN2020/122955 , International Search Report and Written Opinion, Jul. 22, 2021, 9 pages.

Samsung , "Discussion on latency reduction in IAB", R3-205417, 3GPP TSG-RAN WG3 #109-e, online, Agenda Item 13.3.2, Aug. 17-28, 2020, 5 pages.

Ericsson, "IAB Integration and Associated BH Bearer and BAP Handling", R3-192429, 3GPP TSG-RAN WG3 Meeting #104, Reno, Nevada, Agenda Item 13.2.1.2, May 13-17, 2019, 7 pages.

* cited by examiner

SYSTEMS AND METHODS FOR MULTI-HOP CONFIGURATIONS IN IAB NETWORKS FOR REDUCED LATENCY

TECHNICAL FIELD

This application relates generally to wireless communication systems, including Integrated Access and Backhaul (IAB) networks.

BACKGROUND

Wireless mobile communication technology uses various standards and protocols to transmit data between a base station and a wireless mobile device. Wireless communication system standards and protocols can include the 3rd Generation Partnership Project (3GPP) long term evolution (LTE) (e.g., 4G) or new radio (NR) (e.g., 5G); the Institute of Electrical and Electronics Engineers (IEEE) 802.16 standard, which is commonly known to industry groups as worldwide interoperability for microwave access (WiMAX); and the IEEE 802.11 standard for wireless local area networks (WLAN), which is commonly known to industry groups as Wi-Fi. In 3GPP radio access networks (RANs) in LTE systems, the base station can include a RAN Node such as a Evolved Universal Terrestrial Radio Access Network (E-UTRAN) Node B (also commonly denoted as evolved Node B, enhanced Node B, eNodeB, or eNB) and/or Radio Network Controller (RNC) in an E-UTRAN, which communicate with a wireless communication device, known as user equipment (UE). In fifth generation (5G) wireless RANs, RAN Nodes can include a 5G Node, NR node (also referred to as a next generation Node B or g Node B (gNB)).

RANs use a radio access technology (RAT) to communicate between the RAN Node and UE. RANs can include global system for mobile communications (GSM), enhanced data rates for GSM evolution (EDGE) RAN (GERAN), Universal Terrestrial Radio Access Network (UTRAN), and/or E-UTRAN, which provide access to communication services through a core network. Each of the RANs operates according to a specific 3GPP RAT. For example, the GERAN implements GSM and/or EDGE, RAT, the UTRAN implements universal mobile telecommunication system (UMTS) RAT or other 3GPP RAT, the E-UTRAN implements LTE RAT, and NG-RAN implements 5G RAT, In certain deployments, the E-UTRAN may also implement 5G RAT.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

The present disclosure is related to Integrated Access and Backhaul (IAB), which is a feature being designed in 3GPP to enable multi-hop routing. IAB nodes serve as both access nodes to UEs and provide backhaul (BH) links to other IAB nodes. On the wireless backhaul, the IP layer is carried over the Backhaul Adaptation Protocol (BAP) sublayer, which enables routing over multiple hops. The BAP allows for the IAB nodes to talk to each other and provides for a number of number of functionalities which including, for example, mapping of next hops radio link control (RLC) channels, routing to next hop IAB nodes (both child and parent) based on traffic differentiation, indication of network events (e.g., radio link failure (RLF)), data transfer, and/or flow control feedback signaling.

On each backhaul link, the RAP protocol data units (PDUs) are carried BH RLC channels. Multiple BH RLC channels can be configured on each BH link to allow traffic prioritization and quality of service (QoS) enforcement. The BH-RLC-channel mapping for BAP PDUs is performed by the BAP entities on each IAB node and the IAB donor data unit (DU). In certain systems, RLC channel mapping is primarily done through a radio resource control (RRC) reconfiguration message (RRCReconfiguration message) from the donor control unit (CU) to each of the individual nodes. In some implementations of BH RLC channel establishment, separate RRCReconfiguration messages are used to ensure that the setup is done hop by hop until the final destination (at the UE).

Even though the process of configuring the individual IAB nodes is done hop by hop, the configuration itself and the message itself is the same in IAB nodes, which causes multiple RRCReconfiguration round trip time latencies for this process. The degree of latency problem is similar in both one-to-one (1-1) and many-to-one (many-1) BH RLC mapping configurations. Network events such as poor radio frequency (RF) coverage leading to RLFs and node overloads can cause further delays in the establishment of the BH RLC channels to the UE. Thus, applications with increased QoS, such as those requiring ultra-reliable low-latency communication (URLLC), may face large setup and maintenance latencies.

Figure 1:
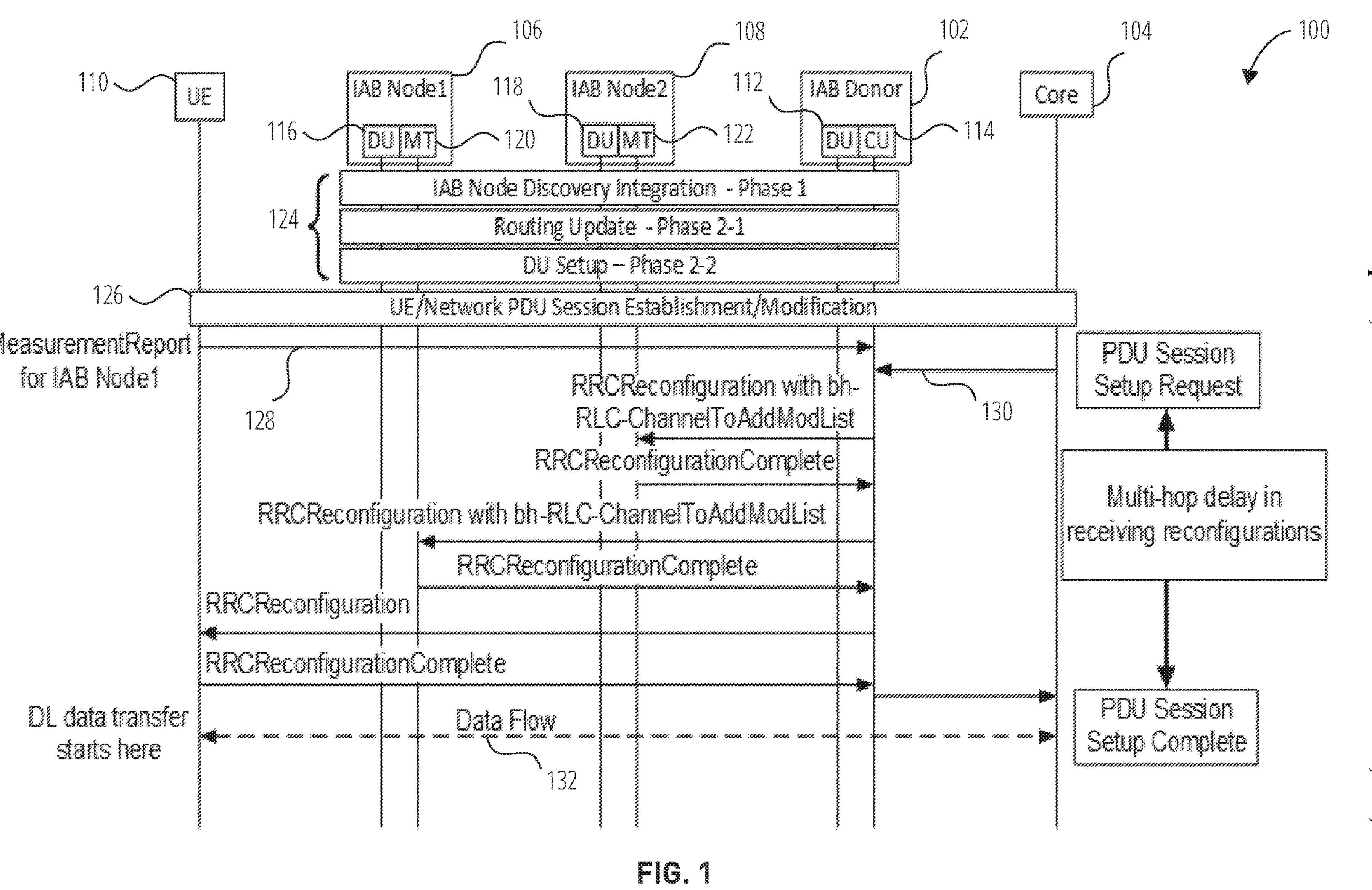
FIG. 1 illustrates an example Integrated Access and Backhaul (IAB) network.

FIG. 1 illustrates RRCReconfiguration for BH RLC channel call flow of an example IAB network 100. The IAB network 100 includes an IAB donor 102 with fiber connectivity (e.g., through an NG interface) to a core network 104 (e.g., a NR core). In this example, the IAB network 100 also includes an IAB node 106 (shown as IAB Node1) and an IAB node 108 (shown as IAB Node2), although any number of IAB nodes or hops may be used to establish a connection between a UE 110 and the core network 104. The IAB donor 102, which may also be referred to as a backend node, comprises a DU 112 and a CU 114. The IAB node 106 and the IAB node 108 may be referred to as intermediate nodes, child nodes or relay nodes and each includes two subcomponents: a DU (shown as DU 116 and DU 118) and a mobile terminal (MT) (shown as MT 120 and MT 122).

An MT comprises components that configure a network node (e.g., gNB) to behave similar to a regular UE. For example, protocols that typical UEs use to connect to the network are supported in the MT with additional enhancements discussed in 3GPP Rel. 16 and Rel. 17, The MT 122, for example, allows the IAB node 108 to establish signaling radio bearers (SRBs) and/or data radio bearers (DRBs) with its parent node (the IAB donor 102). An MT performs cell selection to identify which parent to join, sets up and utilizes RLC through the BAP layer that provides functionality for routing data for different UE bearers over different routes through the network.

As shown in FIG. 1, an IAB integration procedure 124 may include three phases (shown as Phase 1, Phase 2-1, and Phase 2-2) for an IAB node to join the IAB network 100. Phase 1 includes IAB node discovery integration where, for example, the IAB node 106 as the joining IAB node may attempt to identify other IAB nodes, including the IAB node 108 and the IAB donor 102, to establish a connection with the core network 104. For example, the IAB node 106 may use the functions of its MT 120 to execute an initial access procedure. In Phase 2-1, the IAB donor 102, the IAB node 106, and the IAB node 108 perform a routing update procedure to establish a routing management scheme among themselves through which data from the UE 110 (and other UEs connected to the IAB node 106) can reach the core network 104. For example, the IAB donor 102 may establish one or more BH RLC channels at one or more intermediate hops towards the IAB node 106 and update routing tables at the intermediate hops. Then, in Phase 2-2, the BH RLC connectivity established in Phase 2-1 is used to configure the DU 116 of the IAB node 106. Once the DU 116 has been setup, the IAB node 106 can serve the UE 110 and/or other UEs.

The UE 110 and the core network 104 can then perform a PDU session establishment/modification procedure 126 wherein the UE 110 may send a measurement report 128 for the IAB node 106 and the core network 104 may send a PDU session setup request 130. However, as shown in FIG. 1, there may be a multi-hop delay in receiving reconfiguration complete messages from each of the IAB node 108, the IAB node 106, and the UE 110 before the PDU session setup is complete and data flow 132 can begin between the UE 110 and the core network 104. For example, in response to the PDU session setup request 130 the IAB donor 102 sequentially sends an RRCReconfiguration message with BH information (bh-RLC-ChannelToAddModList) and receives an RRCReconfigurationComplete message from the IAB node 108 and the IAB node 106. Then, the IAB donor 102 sends an RRCReconfiguration message to the UE 110 and receives an RRCReconfigurationComplete message in response, which is forwarded to the core network 104 to complete the PDU session establishment procedure. Such multi-hop delay may be undesirable for many applications.

Figure 2A:
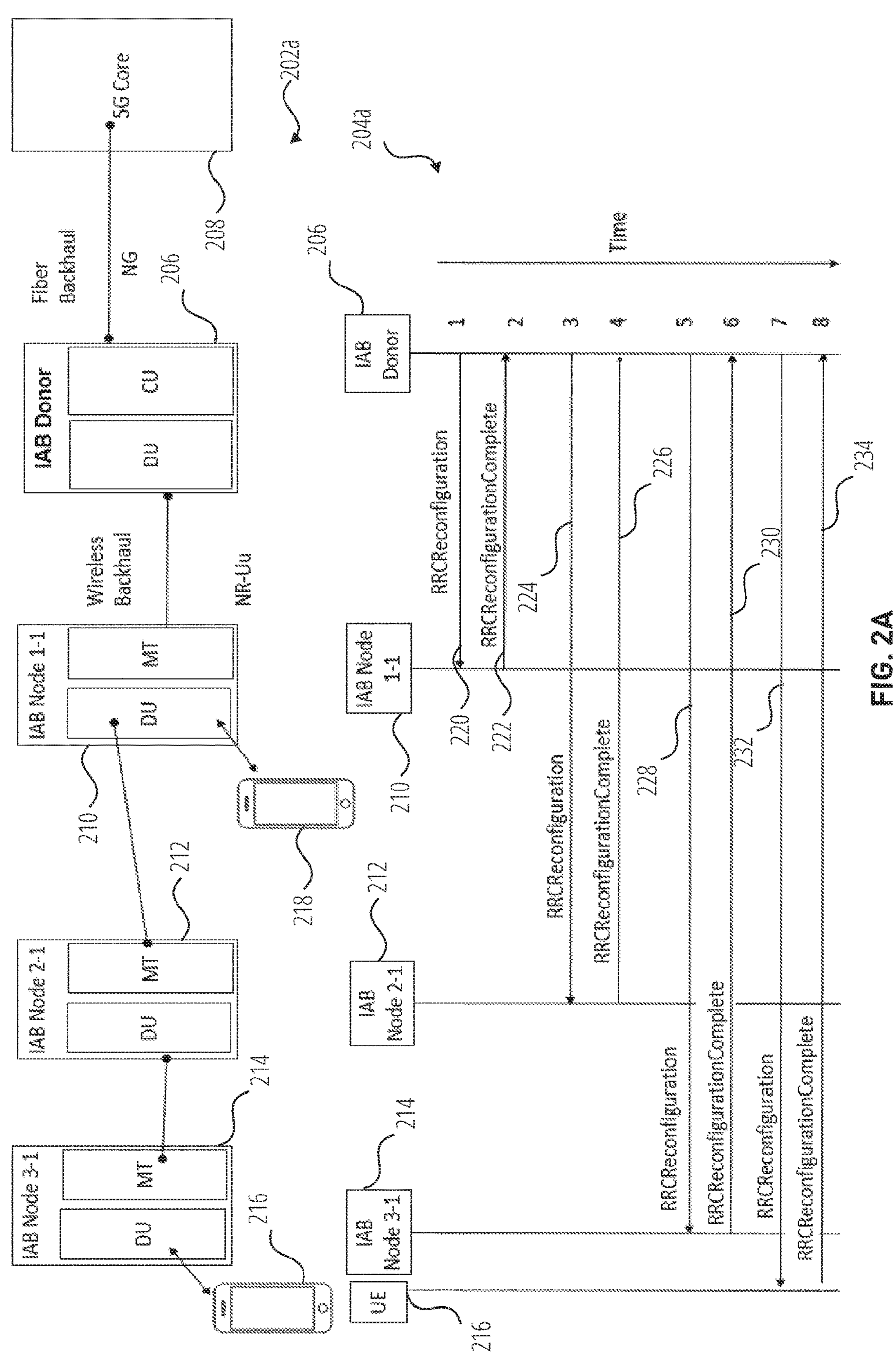
FIG. 2A illustrates an example IAB network and corresponding signaling diagram for BH RLC channel setup in accordance with one embodiment.

FIG. 2A illustrates an example IAB network 202*a* and corresponding signaling diagram 204*a* for BB RLC channel setup in certain network implementations. The IAB network 202*a* includes an IAB donor 206 with a fiber backhaul connection (e.g., through an NG interface) to a 5G core network 208. In this example, the IAB network 202*a* also includes an IAB node 210 (shown as IAB Node 1-1), an IAB node 212 (shown as IAB Node 2-1), and an IAB node 214 (shown as IAB Node 3-1). Also in this example, the IAB node 214 establishes communication between a UE 216 and the 5G core network 208 using a wireless backhaul (e.g., using an NR-Uu interface). Skilled persons will recognize from the disclosure herein that any of the IAB nodes may also provide communication other UEs. For example, the IAB node 210 may establish communication between a UE 218 and the 5G core network 208. As described above with respect to FIG. 1, the IAB donor 206 includes a DU an CU, and each of the IAB node 210, IAB node 212, and IAB node 214 includes a DU and an MT.

The signaling diagram 204*a* illustrates the BH RLC channel setup procedure for the IAB network 202*a* implemented by certain wireless networks. The IAB donor 206 sends an RRCReconfiguration message 220 to the IAB node 210 and receives in response an RRCReconfigurationComplete message 222. Then, the IAB donor 206 sends an RRCReconfiguration message 224 to the IAB node 212 and receives in response an RRCReconfigurationComplete message 226. The IAB donor 206 then sends an RRCReconfiguration message 228 to the IAB node 214 and receives in response the RRCReconfigurationComplete message 230. Finally, the IAB donor 206 sends an RRCReconfiguration message 232 to the UE 216 and receives in response an RRCReconfigurationComplete message 234. By sequentially processing RRCReconfiguration and RRCReconfigurationComplete messages for each hop, the IAB donor 206 introduces delay in the BH RLC channel setup procedure.

Figure 2B:
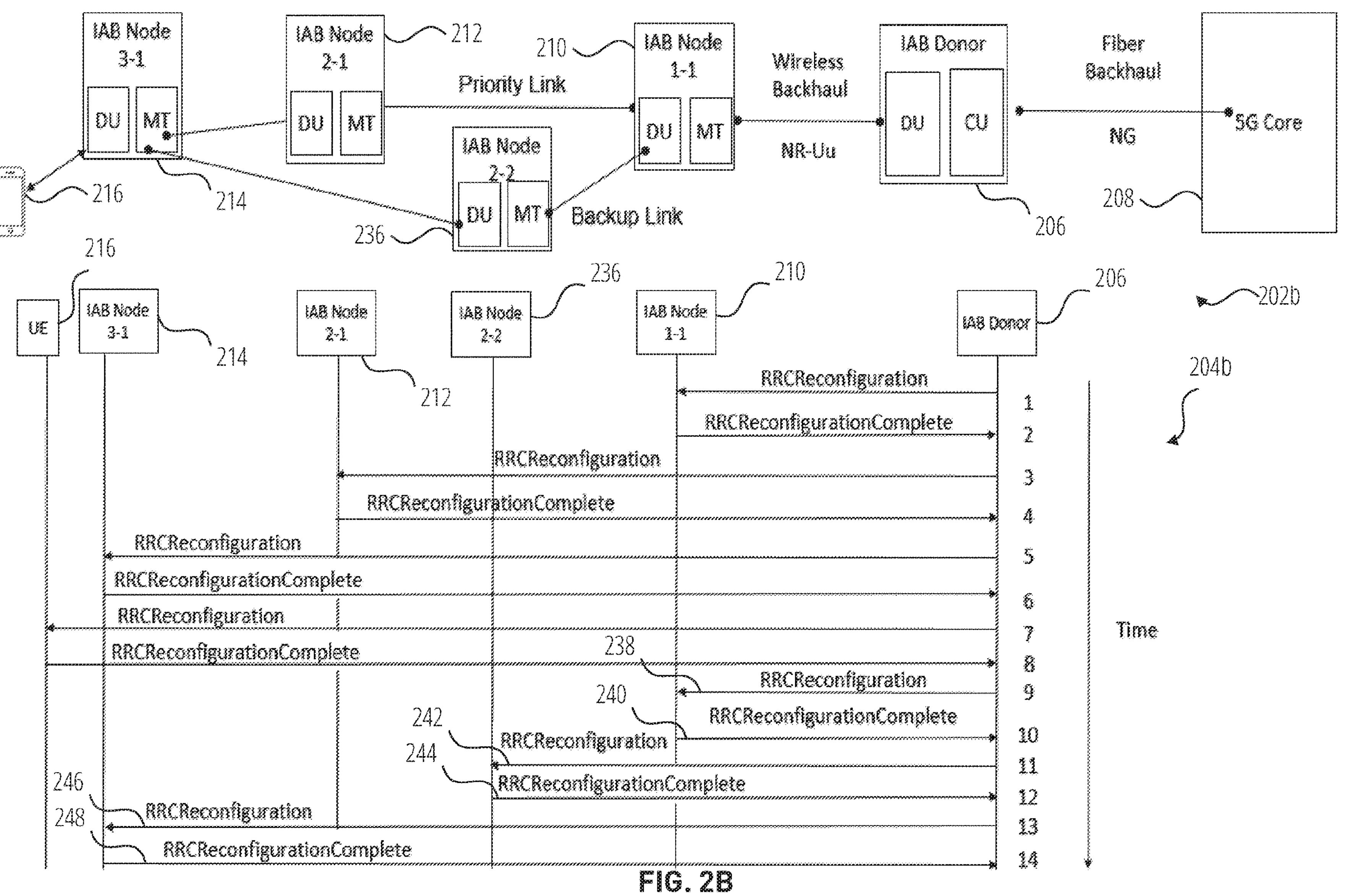
FIG. 2B illustrates an example IAB network with a backup link and a corresponding signaling diagram for BH RLC channel setup in accordance with one embodiment.

As another example, FIG. 2B illustrates an example IAB network 202*b* with a backup link and a corresponding signaling diagram 204*b* for BH RLC channel setup in certain network implementations. In this example, a priority link between the IAB node 210 and the IAB node 214 is established through the IAB node 212 (as shown in FIG. 2A), and a backup link between the IAB node 210 and the IAB node 214 is established through an IAB node 236 (shown as IAB node 2-2). The signaling diagram 204*b* includes each of the RRCReconfiguration and RRCReconfigurationComplete messages shown in FIG. 2A followed by additional messages to establish the path through the backup link. As shown in FIG. 2B, the IAB donor 206 sends an RRCReconfiguration message 238 to the IAB node 210 and receives an RRCReconfigurationComplete message 240. Then, the IAB donor 206 sends an RRCReconfiguration message 242 to the IAB node 236 and receives a response RRCReconfigurationComplete message 244. The IAB donor 206 then sends an RRCReconfiguration message 246 to the IAB node 214 and receives an RRCReconfiguration-Complete message 248. Thus, the delay shown in FIG. 2B due to the sequential RRCReconfiguration and RRCReconfigurationComplete messages is increased over that shown in FIG. 2A.

Thus, certain embodiments herein provide configuration latency reduction.

In certain embodiments, architectural changes are provided to improve efficiency. For example, network node grouping may be used such that nodes belonging to a same common configuration that needs updating can be updated using a single RRCReconfiguration message (e.g., like a group page message). A group may be made out of the IAB nodes that reach a UE (similar to Internet Group Management Protocol (IGMP)). A sub-netting concept may be used to create a layered architecture for an IAB network wherein nodes that are children are part of a parent node's sub-net. This reduces the burden on multicasting where all recipients can then be designated using a single subnet prefix.

In certain embodiments, modifications to a BAP header supports faster DRB transmissions. In other embodiments, for both SRB and DRB flows, configuration forwarding is used to reduce configuration latency wherein a single RRCReconfiguration message is forwarded to the intermediate nodes while each processes the configuration and responds back independently. In yet another embodiment, for both SRB and DRB flows, configuration multi-casting is used for simultaneous IAB node and backup configurations. In certain such embodiments, methods are provided for fast activation of backup links in IAB nodes.

I. BAP Header Modification

In one embodiment, one or more fields are added to the BAP header to make delivery of the RRCReconfiguration message to nodes in the path to the UE easier and/or faster while retaining the reliability afforded by BAP. For example, under certain situations the DESTINATION address of the BAP header may be treated as a multicast address. Further, a single bit in the BAP header may be used to indicate whether the DESTINATION address is to be treated as a unicast address or a multicast address.

Figure 3:
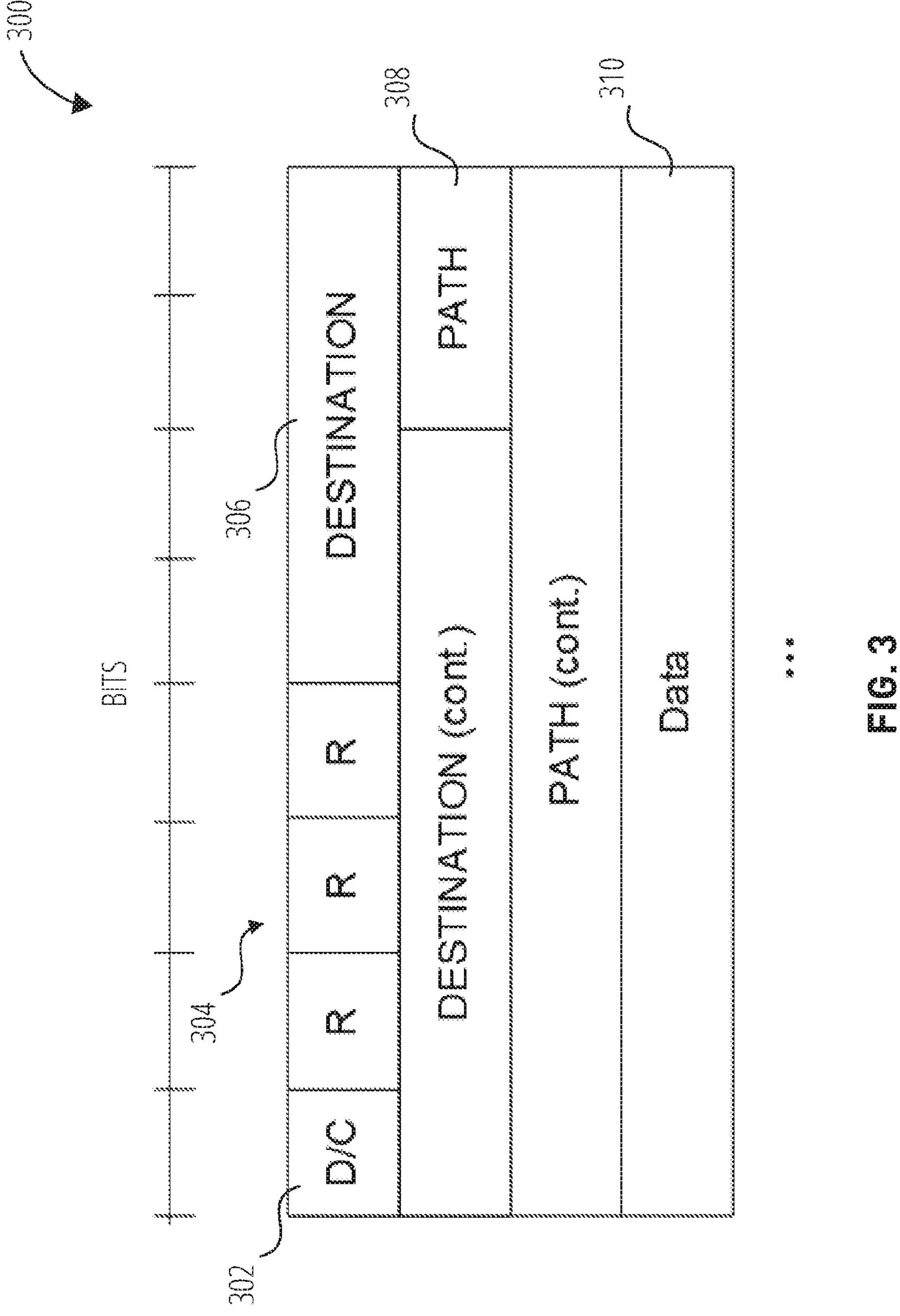
FIG. 3 illustrates a BAP PDU comprising a BAP header that may be modified in accordance with one embodiment.

For example, FIG. 3 illustrates a BAP PDU 300 comprising a BAP header that may be modified according to certain embodiments herein. The BAP header comprises the first three octets of the BAP PDU 300. The first octet of the BAP header includes a D/C bit 302 to indicate whether the BAP PDU 300 is a BAP data PDU or a BAP control PDL, three reserved bits 304 and a first portion (e.g., four bits) of a DESTINATION field 306. The second octet of the BAP header includes a second portion (e.g., six bits) of the DESTINATION field 306 and a first portion (e.g., two bits) of a PATH field 308. The third octet of the BAP header includes a second portion (e.g., eight bits) of the PATH field 308. Following the BAP header, the BAP PDU 300 comprises data 310.

In one embodiment, one of the reserved bits 304 (e.g., the most significant reserved bit) is reconfigured as a BAP multicast bit to indicate whether the DESTINATION field 306 is configured as a unicast address (i.e., a BAP address of the destination IAB-node or IAB-donor-DU) or as a multicast address. For example, the BAP multicast bit may be set to "1" to indicate to the intermediate nodes that the address provided in the DESTINATION field 306 should be treated as a broadcast address for the BAP path identity (Path ID) in the PATH field 308, and the BAP multicast bit may be set to "0" to indicate that the DESTINATION field 306 should be treated as a unicast address. In certain embodiments, the actual RLC itself may be in Transparent Mode.

Using the BAP PDU 300 with the modified BAP header has several advantages. For example, since BAP is network only protocol, the exchange is done only among IAB nodes. Further, the protocol is extensible from unicast to broadcast and other mechanisms. Also, the UEs can be treated separately with RRCReconfiguration once the path is established (e.g., changing the BAP multicast bit to indicate that the DESTINATION field 306 should be treated as a unicast address).

Upon reception of a multicast RRCReconfiguration message, the individual IAB nodes respond back with a unicast RRCReconfigurationComplete message through the BAP protocol. Thus, the method provides a faster way to gather and send responses to reduce round trip latencies.

Figure 4:
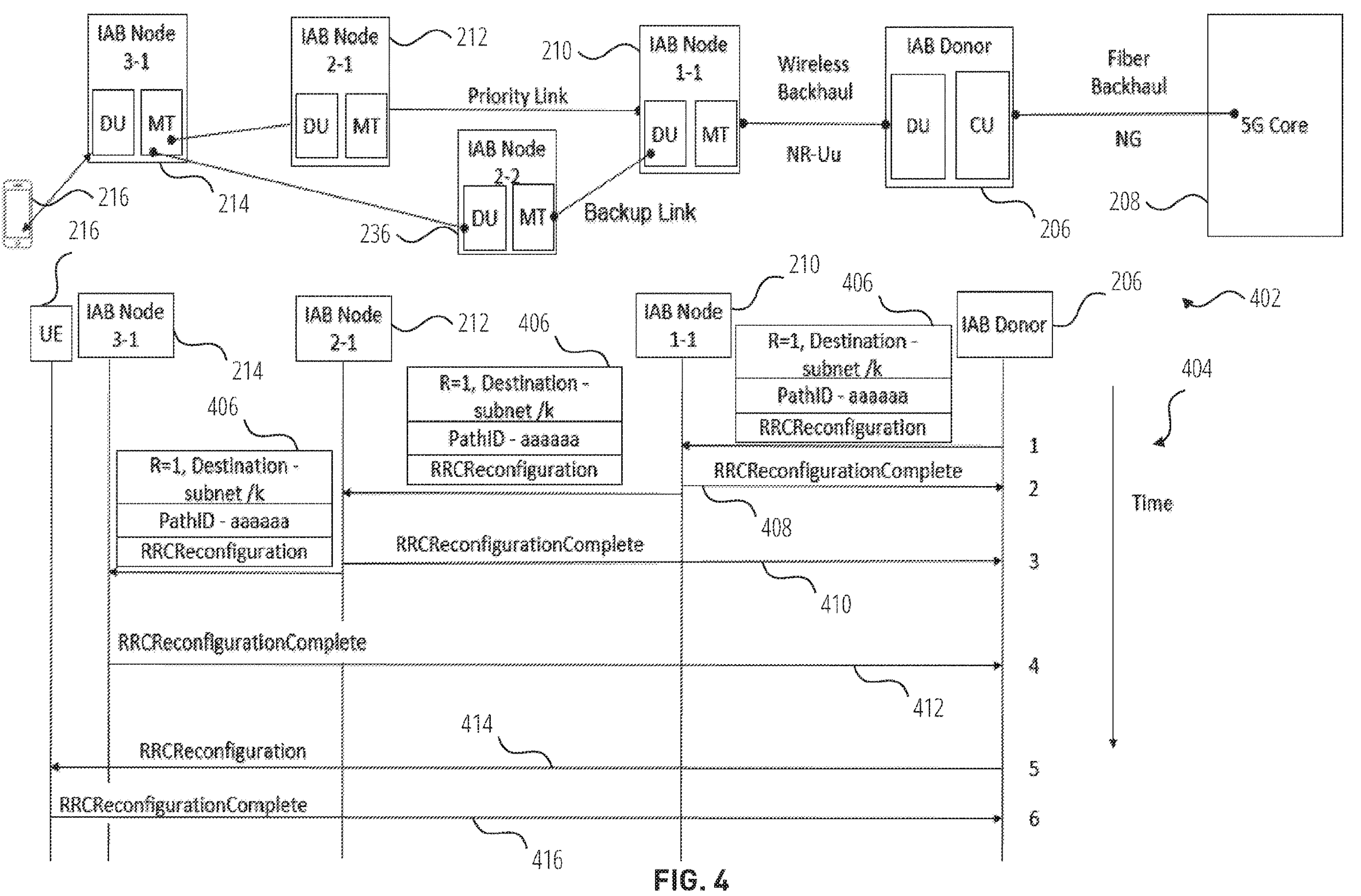
FIG. 4 illustrates an IAB network and a corresponding signaling diagram for BH RLC channel setup with a BAP header modification in accordance with one embodiment.

In certain such embodiments, as discussed above, a network node grouping may be used such that the IAB nodes that reach a UE may be within a subnet identified by the DESTINATION field 306. For example, FIG. 4 illustrates an IAB network 402 (i.e., the IAB network 202*b* shown in FIG. 2B) and a corresponding signaling diagram 404 for BH RLC channel setup with a BAP header modification according to one embodiment. In this example, the IAB donor 206 generates an RRCReconfiguration message 406 comprising a modified BAP header wherein the BAP multicast bit is set (R=1) to indicate that the DESTINATION field is a multicast address (e.g., indicating "subnet /k") for the BAP PathID ("aaaaaa"). The IAB donor 206 may generate the RRCReconfiguration message 406, for example, in response to receiving a PDU session setup request from a core network (see FIG. 1). The IAB donor 206 sends the RRCReconfiguration message 406 to the IAB node 210.

The IAB node 210 responds to the IAB donor 206 with an RRCReconfigurationComplete message 408 and forwards the RRCReconfiguration message 406 to the IAB node 212. The IAB node 212 responds by sending an RRCReconfigurationComplete message 410 to the IAB donor 206 and forwards the RRCReconfiguration message 406 to the IAB node 214. The IAB node 214 also responds by sending an RRCReconfigurationComplete message 412 to the IAB donor 206. After the IAB nodes are configured using the multicast address, the IAB donor 206 sends a unicast RRCReconfiguration message 414 to the UE 216 and the UE 216 responds by sending an RRCReconfigurationComplete message 416 to the IAB donor 206. Similarly, the IAB donor 206 may send other unicast RRCReconfiguration messages to other UEs in connected to the IAB node 214. After receiving the RRCReconfigurationComplete message 416, the IAB donor 206 may send a PDU session setup complete message to the core network (see FIG. 1).

As shown in the signaling diagram 404 of FIG. 4, because the IAB donor 206 only sends the RRCReconfiguration message 406 once, the roundtrip latency is reduced. Thus, using a BAP header modification for BH RLC channel setup uses six RRCReconfiguration and RRCReconfigurationComplete messages as compared to the eight RRCReconfiguration and RRCReconfigurationComplete messages used in the example of FIG. 2B, which indicates that the overall latency is reduced.

Figure 5:
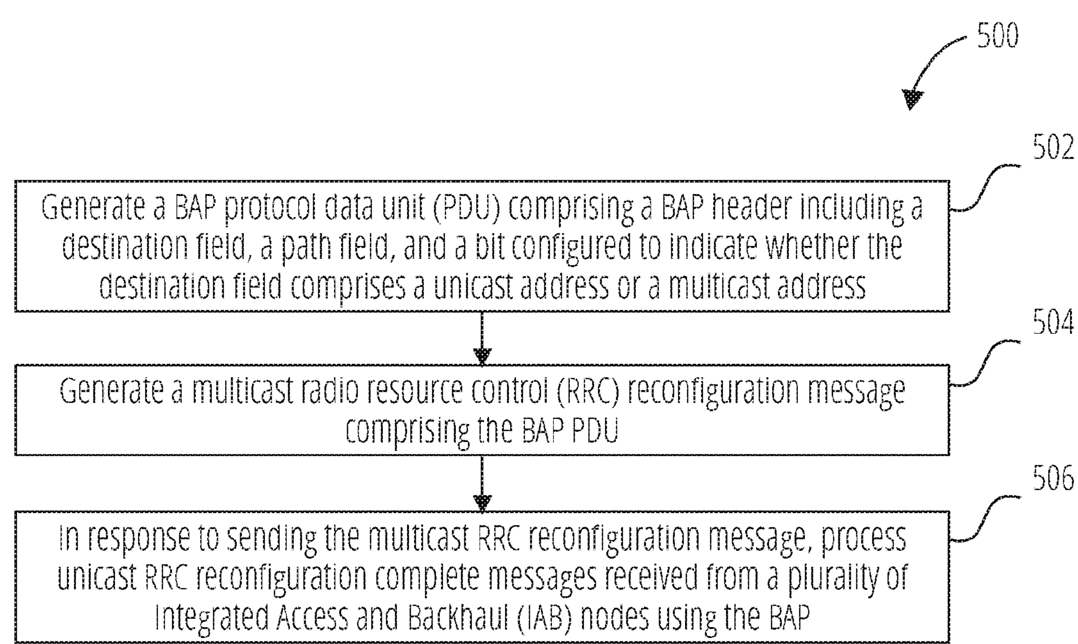
FIG. 5 illustrates a method in accordance with one embodiment.

FIG. 5 is a flowchart of a method 500 for backhaul radio link control (RLC) channel establishment using a backhaul adaptation protocol (BAP) in a wireless network according to one embodiment. The method 500 may be performed by, for example, the IAB donor 206 shown in FIG. 4 and other figures herein. In block 502, the method 500 includes generating a BAP protocol data unit (PDU) comprising a BAP header including a destination field, a path field, and a bit configured to indicate whether the destination field comprises a unicast address or a multicast address. In block 504, the method 500 includes generating a multicast radio resource control (RRC) reconfiguration message comprising the BAP PDU, In block 506, the method 500 includes, in response to sending the multicast RRC reconfiguration message, processing unicast RRC reconfiguration complete messages received from a plurality of Integrated Access and Backhaul (IAB) nodes using the BAP.

Certain embodiments of the method 500 further include setting the bit to indicate to the plurality of IAB nodes to treat an address in the destination field as the multi cast address for a path identifier in the path field of the BAP header. The method 500 may further include grouping the plurality of IAB nodes into a subnet corresponding to a subnet prefix, and including the subnet prefix in the destination field of the BAP header.

In addition, or in other embodiments, the method 500 includes; generating the BAP PDU in response to a PDU session setup request from a core network; in response to processing the unicast RRC reconfiguration complete messages from the plurality of IAB nodes, sending a unicast RRC reconfiguration message to a user equipment (UE) in communication with one of the plurality of IAB nodes; processing an RRC reconfiguration complete message from the UE; and in response to the RRC reconfiguration complete message from the UE, sending a PDU session setup complete message to the core network. The plurality of IAB nodes may comprise a first IAB node for a priority link in a first backhaul path between the UE and the core network and a second IAB node for a backup link in a second backhaul path between the UE and the core network.

II. Configuration Forwarding

In certain embodiments, a single RRCReconfiguration message is forwarded to the intermediate nodes while each processes the configuration and responds back independently. New fields and/or information elements (IEs) may be created in the RRCReconfiguration message to allow for packet forwarding to happen hop-by-hop between the nodes. In certain such embodiments, as discussed above, a network node grouping may be used such that the IAB nodes that reach a UE may be within a subnet.

In an example embodiment, a ForwardTo field (e.g., comprising an Internet Protocol address (ipAddress) of the next hop or a list of IP addresses for sequential hops) is added into the RRCReconfiguration Message as an IE for the IAB nodes. Each intermediate node upon receiving the RRCReconfiguration with the ForwardTo field responds with a unicast RRCReconfigurationComplete message. In certain embodiments, countdown hopping or hot-potato routing may be used.

In case of no forwarding capability or failures, an IAB node may retry only to the node that did not receive the RRCReconfiguration message. In addition, or in another embodiment, the IAB node detecting the failure may use the same RRC procedures until a threshold number attempts have been made. The threshold number of attempts may be defined in an IE of the RRCReconfiguration message.

In one embodiment, an RRCReconfigurationComplete message is sent by each intermediate node with its respective ID. In another embodiment, an RRCReconfiguration-Complete message is sent only by the end node or a node at which failure happened (e.g., so that there is another attempt).

Figure 6:
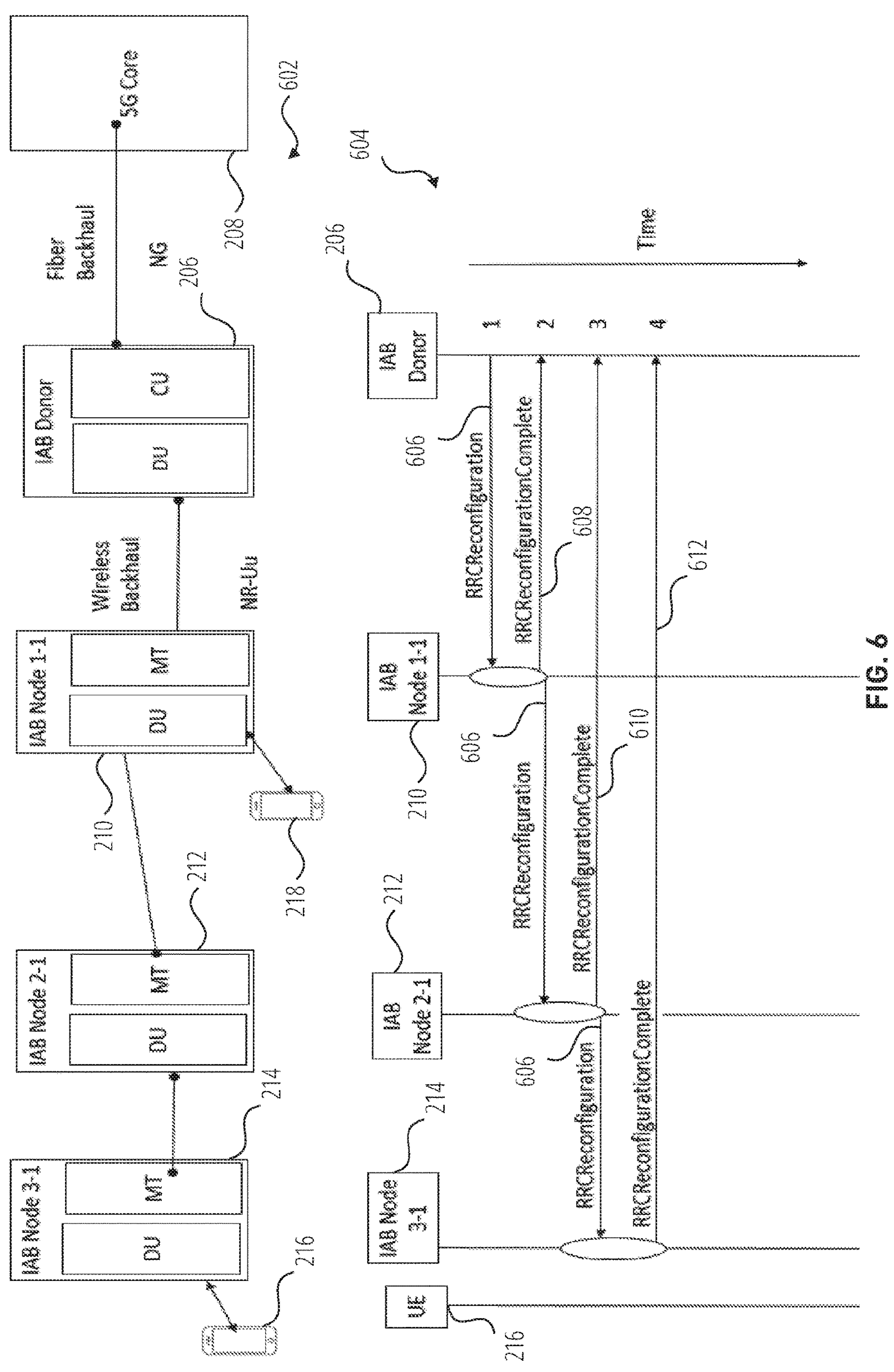
FIG. 6 illustrates an IAB network and a corresponding signaling diagram for BH RLC channel setup with configuration forwarding in accordance with one embodiment.

FIG. 6 illustrates an IAB network 602 (i.e., the IAB network 202*a* shown in FIG. 2A) and a corresponding signaling diagram 604 for BEI RLC channel setup with configuration forwarding according to certain embodiments. In this example, the IAB donor 206 sends an RRCReconfiguration message 606 to the IAB node 210. The RRCReconfiguration message 606 may include a list of forwarding addresses (e.g., corresponding to the IAB node 212 and the IAB node 214). In response to the RRCReconfiguration message 606, the IAB node 210 responds to the IAB donor 206 with an RRCReconfigurationComplete message 608. The IAB node 210 determines the IP address of the next hop from the list of forwarding addresses and sends the RRCReconfiguration message 606 to the IAB node 212. The IAB node 212 responds by sending an RRCReconfigurationComplete message 610 to the IAB donor 206 and determines the IP address of the next hop from the list of forwarding addresses. The IAB node 212 then sends the RRCReconfiguration message 606 to the IAB node 214. The IAB node 214 responds by sending an RRCReconfigurationComplete message 612 to the IAB donor 206. Thus, the roundtrip latency is reduced (e.g., as compared to the example shown in FIG. 2A).

Figure 7:
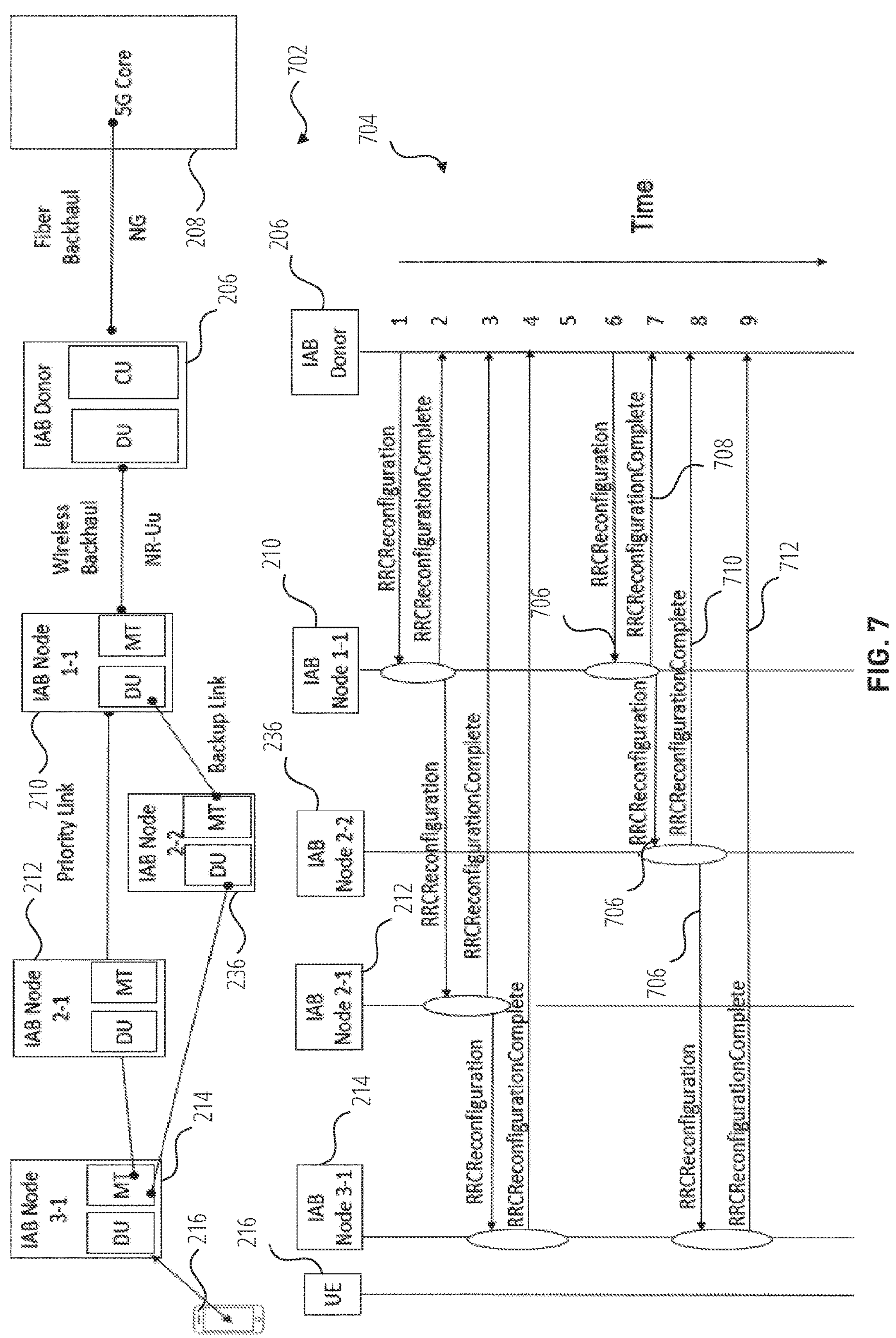
FIG. 7 illustrates an IAB network and a corresponding signaling diagram for BH RLC channel setup in accordance with one embodiment.

As another example, FIG. 7 illustrates an IAB network 702 with a backup link (i.e., the IAB network 202*b* shown in FIG. 2B) and a corresponding signaling diagram 704 for BH RLC channel setup according to certain embodiments. For forwarding with a backup link from the IAB donor 206 to the IAB node 214 through the IAB node 236, the signaling diagram 704 includes each of the RRCReconfiguration and RRCReconfigurationComplete messages shown in FIG. 6 followed by additional messages to establish the path through the backup link. As shown in FIG. 7, the IAB donor 206 sends an RRCReconfiguration message 706 to the IAB node 210. The RRCReconfiguration message 706 may include a list of forwarding addresses (e.g., corresponding to the IAB node 236 and the IAB node 214). In response to the RRCReconfiguration message 706, the IAB node 210 responds to the IAB donor 206 with an RRCReconfigurationComplete message 708. The IAB node 210 determines the IP address of the next hop from the list of forwarding addresses and sends the RRCReconfiguration message 706 to the IAB node 236. The IAB node 236 responds by sending an RRCReconfigurationComplete message 710 to the IAB donor 206 and determines the IP address of the next hop from the list of forwarding addresses. The IAB node 236 then sends the RRCReconfiguration message 706 to the IAB node 214, The IAB node 214 responds by sending an RRCReconfigurationComplete message 712 to the IAB donor 206. Thus, the roundtrip latency in the example shown in FIG. 7 is less than that of the example shown in FIG. 2B.

Figure 8:
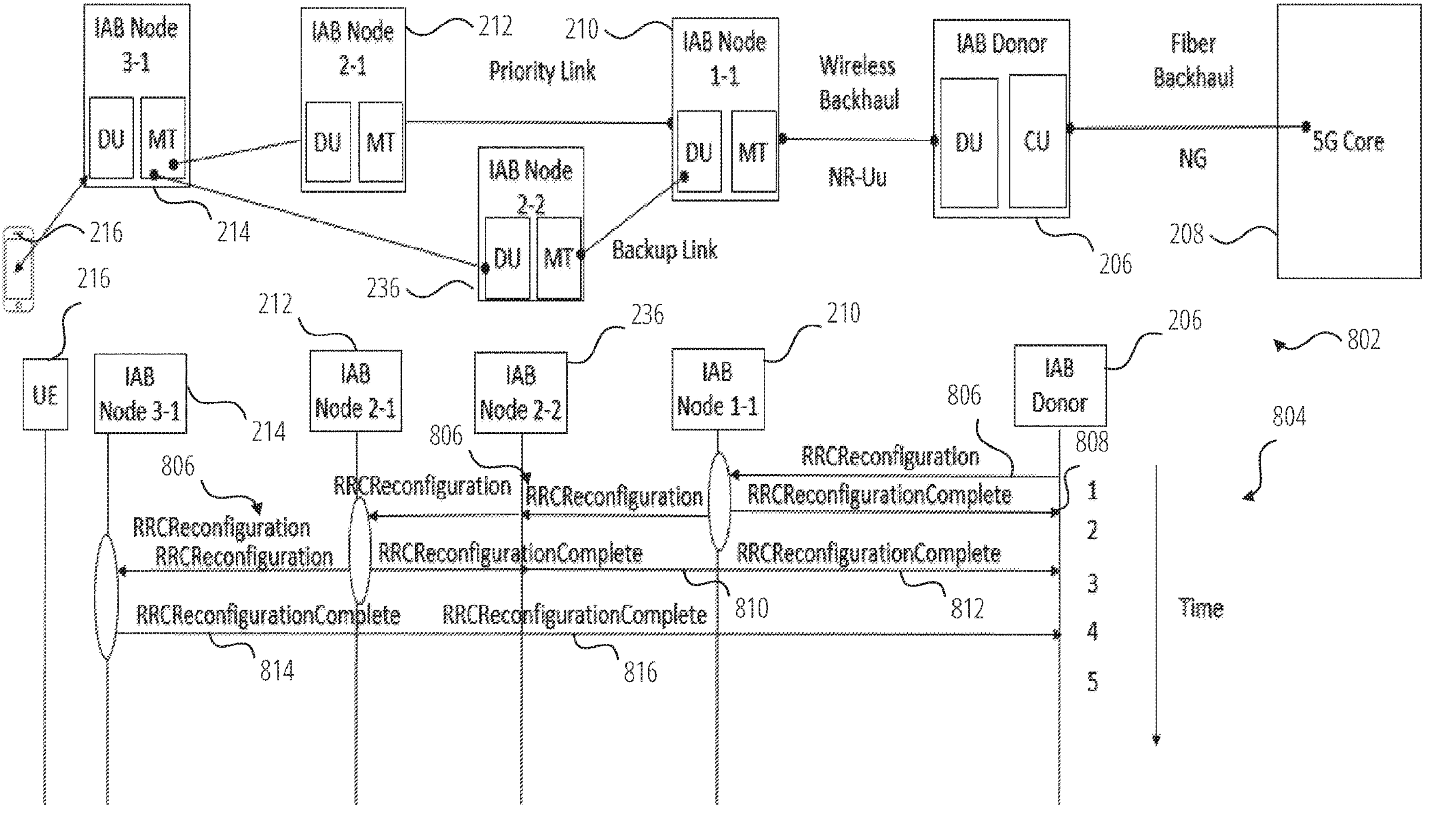
FIG. 8 illustrates an IAB network with a backup link and a corresponding signaling diagram for BH RLC channel setup in accordance with one embodiment.

Alternatively, FIG. 8 illustrates an IAB network 802 with a backup link (i.e., the IAB network 202*b* shown in FIG. 2B) and a corresponding signaling diagram 804 for BH RLC channel setup according to another embodiment with early path setup. In this example, the priority link and the backup link may be setup simultaneously (or nearly simultaneously). For example, The IAB donor 206 sends an RRCReconfiguration message 806 to the IAB node 210. The RRCReconfiguration message 806 may include a list of forwarding addresses. In response to the RRCReconfiguration message 806, the IAB node 210 responds to the IAB donor 206 with an RRCReconfigurationComplete message 808. The IAB node 210 determines the IP address of the next hops for both the priority link and the backup link from the list of forwarding addresses and sends the RRCReconfiguration message 706 simultaneously or nearly simultaneously to the IAB node 212 and the IAB node 236. The IAB node 212 and the IAB node 236 respond by send an RRCReconfigurationComplete message 810 and an RRCReconfigurationComplete message 812, respectively, to the IAB donor 206. The IAB node 212 and the IAB node 236 also each send the RRCReconfiguration message 806 to the IAB node 214. The IAB node 214 may respond with a single RRCReconfigurationComplete message 814 to the IAB donor 206. In another embodiment, the IAB node 214 responds with an RRCReconfigurationComplete message 814 corresponding to the RRCReconfiguration message 806 received from the IAB node 212 and an RRCReconfigurationComplete message 816 corresponding to the RRCReconfiguration message 806 received from the IAB node 236. Either way, the roundtrip latency is reduced as compared to that of the example shown in FIG. 7.

In certain embodiments, as discussed below, fast activation signals are used for activation and deactivation of the backup links established according to the examples shown in FIG. 7 and FIG. 8.

III. RRCReconfiguration with Multicasting

Certain embodiments provide configuration multicasting for simultaneous IAB node and backup configurations. For example, an IAB donor and the child IAB nodes may be configured as a subnet to allow multicasting. A single reconfiguration message may be sent to the subnet and all nodes belonging to that subnet. The reconfiguration message may be included in a ForSubnet IE.

The single shot multi configuration model can be used for all architectures where there are multiple DU components involved (e.g., sideline (SL), non-terrestrial networks (NTN), etc.). Further, the single shot multi configuration model may be equally applicable to both the one-to-one (1-1) and many-to-one (many-1) mapping configurations of RLC for IAB. If a UE's IP address belongs to the subnet, the UE will apply the RRCReconfiguration settings. The UE will then respond back with a unicast RRCReconfigurationComplete message. In certain embodiments, the network can also form an ad hoc configuration in this way.

An advantage of this method includes being extensible to mobile IAB nodes as it can be applied to mobile NTN network nodes).

Figure 9:
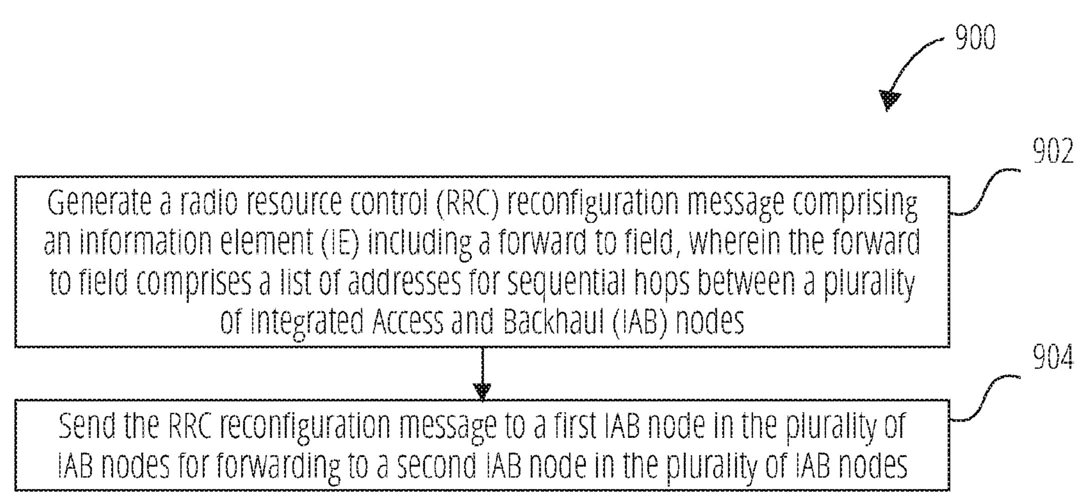
FIG. 9 illustrates a method in accordance with one embodiment.

FIG. 9 is a flowchart of a method 900 for backhaul radio link control (RLC) channel establishment using configuration forwarding in a wireless network according to one embodiment. The method 900 may be performed by, for example, the IAB donor 206 shown in FIG. 6 to FIG. 8 and other figures herein. In block 902, the method 900 includes generating a radio resource control (RRC) reconfiguration message comprising an information element (IE) including a forward to field, wherein the forward to field comprises a list of addresses for sequential hops between a plurality of Integrated Access and Backhaul (IAB) nodes. In block 904, the method 900 includes sending the RRC reconfiguration message to a first IAB node in the plurality of IAB nodes for forwarding to a second IAB node in the plurality of IAB nodes.

In certain embodiments, the method 900 further includes receiving an RRC reconfiguration complete message from each node in the plurality of IAB nodes.

In certain embodiments, the method 900 further includes receiving an RRC reconfiguration complete message from an end node in the plurality of IAB nodes, wherein the end node is in communication with a user equipment (UE) or detected a failure along a path to establish a connection with the UE. Further, the method 900 may include, based on the failure, resending the RRC reconfiguration message to failed IAB node in the plurality of IAB nodes.

In certain embodiments, the method 900 further includes attempting to reseed the RRC reconfiguration message up to a threshold number of times until, based on receiving one or more RRC reconfiguration complete messages, the backhaul RLC channel establishment is complete.

In certain embodiments, the method 900 further includes grouping the plurality of IAB nodes into a subnet corresponding to a subnet prefix. The plurality of IAB nodes may establish a priority link in a first path between the UE and the core network and a backup link in a second path between the UE and the core network. The RRC reconfiguration message may include a first RRC reconfiguration message corresponding to the first backhaul path including the priority link, and the method 900 may further include generating a second RRC reconfiguration message comprising the IE including the forward to field, wherein the forward to field includes an address for a third IAB node for the backup link, and sending the second RRC reconfiguration message to the first IAB node in the plurality of IAB nodes for forwarding, either directly or indirectly, to the third IAB node in the plurality of IAB nodes. The method 900 may also include receiving an RRC reconfiguration complete message corresponding to the first backhaul path before sending the second RRC reconfiguration message, simultaneously transmitting the first RRC reconfiguration message and the second RRC reconfiguration message to establish both the priority link and the backup link, or processing a media access control (MAC) control element (CE) comprising an indication to activate the backup link. The MAC CE may include an activation/deactivation field and a path identifier (ID) field, and the activation/deactivation field may indicate whether the second path corresponding to the backup link identified by the path ID field is activated or deactivated.

In certain embodiments, the method 900 further includes processing downlink control information (DCI) with a DCI format configured for exchange between the plurality of IAB nodes, the DCI format used for transmission of a group of IAB commands for inter-IAB communications, the group of IAB commands including a command to activate the backup link.

IV. Fast Activation of Backup Links in IAB Nodes

In scenarios where a primary path is lost due to RLF and the secondary path needs to be established in an IAB network, multiple RRC Reconfiguration messages may be sent to ensure that the backup IAB path is established by the CU. See, for example, FIG. 2B. In certain embodiments herein, a configuration multi-casting technique is used to establish secondary backup links simultaneously (e.g., see FIG. 8). However, using one of the forwarding techniques at RRC to activate the backup links once an outage is detected introduces additional latency. Thus, in certain embodiments, techniques using Layer 1 (L1) and/or Layer 2 (L2) stacks are provided to activate the established backup links.

Figure 10:
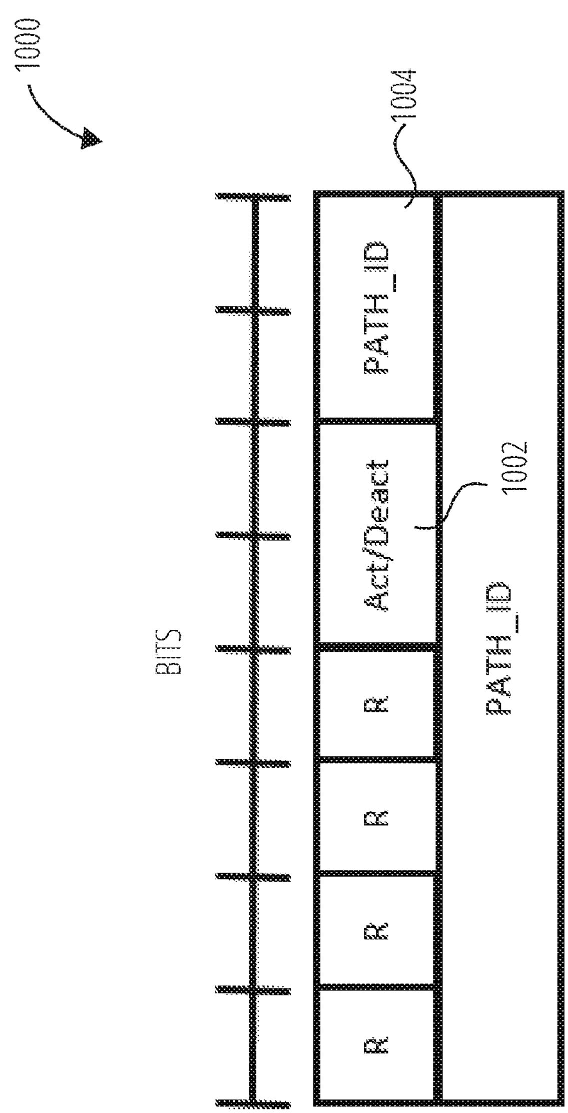
FIG. 10 illustrates an example MAC CE in accordance with one embodiment.

In one embodiment, a new medium access control (MAC) control element (CE) is provided for activation of a backup link. This may be similar to, for example, carrier aggregation (CA) activation just for IAB nodes. For example, FIG. 10 illustrates an example MAC CE 1000 comprising an activation/deactivation field 1002 and a path ID field 1004. A plurality of reserved bits (R) may also be included. The activation/deactivation field 1002 indicates whether a path (e.g., a path corresponding to a backup link) identified by the path ID field 1004 is activated or deactivated.

In another embodiment, a new downlink control information (DCI) format may be used for exchange between IAB nodes only. For example, a DCI Format 4_0 may be used for the transmission of a group of IAB commands for inter-IAB communications by one or more IAB parent nodes. Thus, the DCI format can be used to quickly activate or deactivate an established link in an IAB network.

Figure 11:
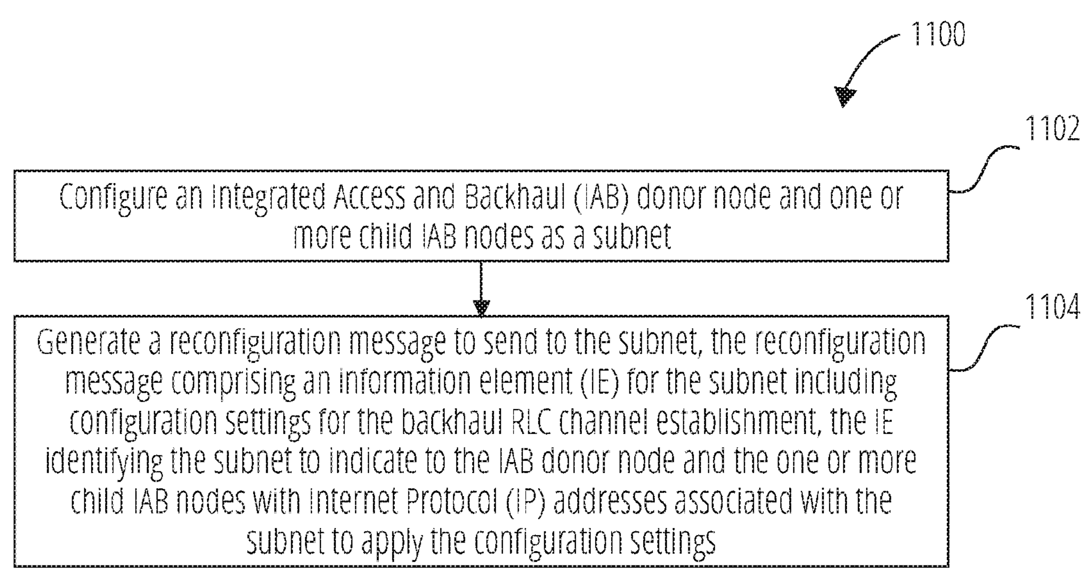
FIG. 11 illustrates a method in accordance with one embodiment.

FIG. 11 is a flowchart of a method 1100 for backhaul radio link control (RLC) channel establishment using radio resource configuration (RRC) reconfiguration with multicasting according to one embodiment. In block 1102, the method 1100 includes configuring an Integrated Access and Backhaul (IAB) donor node and one or more child IAB nodes as a subnet. In block 1104, the method 1100 includes generating a reconfiguration message to send to the subnet. The reconfiguration message comprises an information element (IE) for the subnet including configuration settings for the backhaul RLC channel establishment. The IE identities the subnet to indicate to the IAB donor node and the one or more child IAB nodes with Internet Protocol (IP) addresses associated with the subnet to apply the configuration settings.

In one embodiment of the method 1100, the configuration settings are for a one-to-one (1-1) or a many-to-one (many-1) mapping configuration of the RLC for the IAB.

Figure 12:
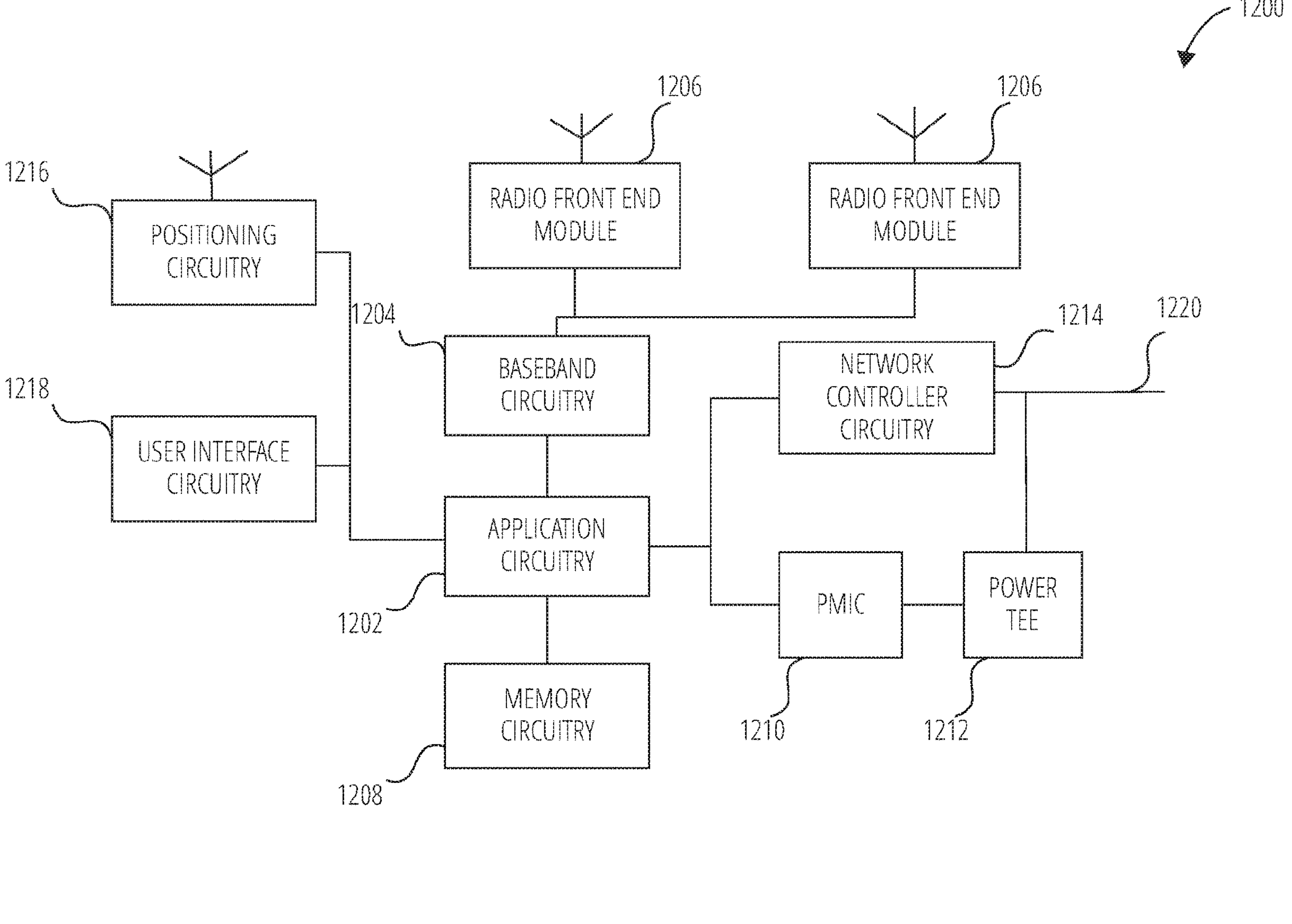
FIG. 12 illustrates an infrastructure equipment in accordance with one embodiment.

FIG. 12 illustrates an example of infrastructure equipment 1200 in accordance with various embodiments. The infrastructure equipment 1200 may be implemented as a base station, radio head, RAN node, AN, application server, and/or any other element/device discussed herein. In other examples, the infrastructure equipment 1200 could be implemented in or by a UE.

The infrastructure equipment 1200 includes application circuitry 1202, baseband circuitry 1204, one or more radio front end module 1206 (RFEM), memory circuitry 1208, power management integrated circuitry (shown as PMIC 1210), power tee circuitry 1212, network controller circuitry 1214, network interface connector 1220, satellite positioning circuitry 1216, and user interface circuitry 1218. In some embodiments, the device infrastructure equipment 1200 may include additional elements such as, for example, memory/storage, display, camera, sensor, or input/output (I/O) interface. In other embodiments, the components described below may be included in more than one device. For example, said circuitries may be separately included in more than one device for CRAN, vBBU, or other like implementations. Application circuitry 1202 includes circuitry such as, but not limited to one or more processors (or processor cores), cache memory, and one or more of low drop-out voltage regulators (LDOs), interrupt controllers, serial interfaces such as SPI, $I^2C$ or universal programmable serial interface module, real time clock (RTC), timer-counters including interval and watchdog timers, general purpose input/output (I/O or IO), memory card controllers such as Secure Digital (SD) MultiMediaCard (MMC) or similar, Universal Serial Bus (USB) interfaces, Mobile Industry Processor Interface (MIPI) interfaces and Joint Test Access Group (JTAG) test access ports. The processors (or cores) of the application circuitry 1202 may be coupled with or may include memory/storage elements and may be configured to execute instructions stored in the memory/storage to enable various applications or operating systems to run on the infrastructure equipment 1200. In some implementations, the memory/storage elements may be on-chip memory circuitry, which may include any suitable volatile and/or non-volatile memory, such as DRAM, SRAM, EPROM, EEPROM, Flash memory, solid-state memory, and/or any other type of memory device technology, such as those discussed herein.

The processor(s) of application circuitry 1202 may include, for example, one or more processor cores (CPUs), one or more application processors, one or more graphics processing units (GPUs), one or more reduced instruction set computing (RISC) processors, one or more Acorn RISC Machine (ARM) processors, one or more complex instruction set computing (CISC) processors, one or more digital signal processors (DSP), one or more FPGAs, one or more PLDs, one or more ASICs, one or more microprocessors or controllers, or any suitable combination thereof. In some embodiments, the application circuitry 1202 may comprise, or may be, a special-purpose processor/controller to operate according to the various embodiments herein. As examples, the processor(s) of application circuitry 1202 may include one or more Intel Pentium®, Core®, or Xeon® processor(s); Advanced Micro Devices (AMID) Ryzen® processor(s), Accelerated Processing Units (APUs), or Epyc® processors; ARM-based processor(s) licensed from ARM Holdings, Ltd. such as the ARM Cortex-A family of processors and the ThunderX2® provided by Cavium™, Inc.; a MIPS-based design from MIPS Technologies, Inc. such as MIPS Warrior P-class processors; and/or the like. In some embodiments, the infrastructure equipment 1200 may not utilize application circuitry 1202, and instead may include a special-purpose processor/controller to process IP data received from an EPC or 5GC, for example.

In some implementations, the application circuitry 1202 may include one or more hardware accelerators, which may be microprocessors, programmable processing devices, or the like. The one or more hardware accelerators may include, for example, computer vision (CV) and/or deep learning (DL) accelerators. As examples, the programmable processing devices may be one or more a field-programmable devices (FPDs) such as field-programmable gate arrays (FPGAs) and the like; programmable logic devices (PLDs) such as complex PLDs (CPLDs), high-capacity PLDs (HCPLDs), and the like; ASICs such as structured ASICs and the like; programmable SoCs (PSoCs); and the like. In such implementations, the circuitry of application circuitry 1202 may comprise logic blocks or logic fabric, and other interconnected resources that may be programmed to perform various functions, such as the procedures, methods, functions, etc. of the various embodiments discussed herein. In such embodiments, the circuitry of application circuitry 1202 may include memory cells (e.g., erasable programmable read-only memory (EPROM), electrically erasable programmable read-only memory (EEPROM), flash memory, static memory (e.g., static random access memory (SRAM), anti-fuses, etc.)) used to store logic blocks, logic fabric, data, etc. in look-up-tables (LUTs) and the like. The baseband circuitry 1204 may be implemented, for example, as a solder-down substrate including one or more integrated circuits, a single packaged integrated circuit soldered to a main circuit board or a multi-chip module containing two or more integrated circuits.

The user interface circuitry 1218 may include one or more user interfaces designed to enable user interaction with the infrastructure equipment 1200 or peripheral component interfaces designed to enable peripheral component interaction with the infrastructure equipment 1200. User interfaces may include, but are not limited to, one or more physical or virtual buttons (e.g., a reset button), one or more indicators (e.g., light emitting diodes (LEDs)), a physical keyboard or keypad, a mouse, a touchpad, a touchscreen, speakers or other audio emitting devices, microphones, a printer, a scanner, a headset, a display screen or display device, etc. Peripheral component interfaces may include, but are not limited to, a nonvolatile memory port, a universal serial bus (USB) port, an audio jack, a power supply interface, etc.

The radio front end module 1206 may comprise a millimeter wave (mmWave) radio front end module (RFEM) and one or more sub-mmWave radio frequency integrated circuits (RFICs). In some implementations, the one or more sub-mmWave RFICs may be physically separated from the mmWave RFEM. The RFICs may include connections to one or more antennas or antenna arrays, and the RFEM may be connected to multiple antennas. In alternative implementations, both mmWave and sub-mmWave radio functions may be implemented in the same physical radio front end module 1206, which incorporates both mm Wave antennas and sub-mmWave.

The memory circuitry 1208 may include one or more of volatile memory including dynamic random access memory (DRAM) and/or synchronous dynamic random access memory (SDRAM), and nonvolatile memory (NVM) including high-speed electrically erasable memory (commonly referred to as Flash memory), phase change random access memory (PRAM), magnetoresistive random access memory (MRAM), etc., and may incorporate the three-dimensional (3D)cross-point (XPOINT) memories from Intel® and Micron®. The memory circuitry 1208 may be implemented as one or more of solder down packaged integrated circuits, socketed memory modules and plug-in memory cards.

The PMIC 1210 may include voltage regulators, surge protectors, power alarm detection circuitry, and one or more backup power sources such as a battery or capacitor. The power alarm detection circuitry may detect one or more of brown out (under-voltage) and surge (over-voltage) conditions. The power tee circuitry 1212 may provide for electrical power drawn from a network cable to provide both power supply and data connectivity to the infrastructure equipment 1200 using a single cable.

The network controller circuitry 1214 may provide connectivity to a network using a standard network interface protocol such as Ethernet, Ethernet over GRE Tunnels, Ethernet over Multiprotocol Label Switching (MPLS), or some other suitable protocol. Network connectivity may be provided to/from the infrastructure equipment 1200 via network interface connector 1220 using a physical connection, which may be electrical (commonly referred to as a "copper interconnect"), optical, or wireless. The network controller circuitry 1214 may include one or more dedicated processors and/or FPGAs to communicate using one or more of the aforementioned protocols. In some implementations, the network controller circuitry 1214 may include multiple controllers to provide connectivity to other networks using the same or different protocols.

The positioning circuitry 1216 includes circuitry to receive and decode signals transmitted/broadcasted by a positioning network of a global navigation satellite system (GNSS). Examples of navigation satellite constellations (or GNSS) include United States' Global Positioning System (GPS), Russia's Global Navigation System (GLONASS), the European Union's Galileo System, China's BeiDou Navigation Satellite System, a regional navigation system or GNSS augmentation system (e.g., Navigation with Indian Constellation (NAVIC), Japan's Quasi-Zenith Satellite System (QZSS), France's Doppler Orbitography and Radio-positioning Integrated by Satellite (DORIS), etc.), or the like. The positioning circuitry 1216 comprises various hardware elements (e.g., including hardware devices such as switches, filters, amplifiers, antenna elements, and the like to facilitate OTA communications) to communicate with components of a positioning network, such as navigation satellite constellation nodes. In some embodiments, the positioning circuitry 1216 may include a Micro-Technology for Positioning, Navigation, and Timing (Micro-PNT) IC that uses a master timing clock to perform position tracking/estimation without GNSS assistance. The positioning circuitry 1216 may also be part of, or interact with, the baseband circuitry 1204 and/or radio front end module 1206 to communicate with the nodes and components of the positioning network. The positioning circuitry 1216 may also provide position data and/or time data to the application circuitry 1202, which may use the data to synchronize operations with various infrastructure, or the like. The components shown by FIG. 12 may communicate with one another using interface circuitry, which may include any number of bus and/or interconnect (IX) technologies such as industry standard architecture (ISA), extended ISA (EISA), peripheral component interconnect (PCI), peripheral component interconnect extended (PCix), PCI express (PCie), or any number of other technologies. The bus/IX may be a proprietary bus, for example, used in a SoC based system. Other bus/IX systems may be included, such as an $I^2C$ interface, an SPI interface, point to point interfaces, and a power bus, among others.

Figure 13:
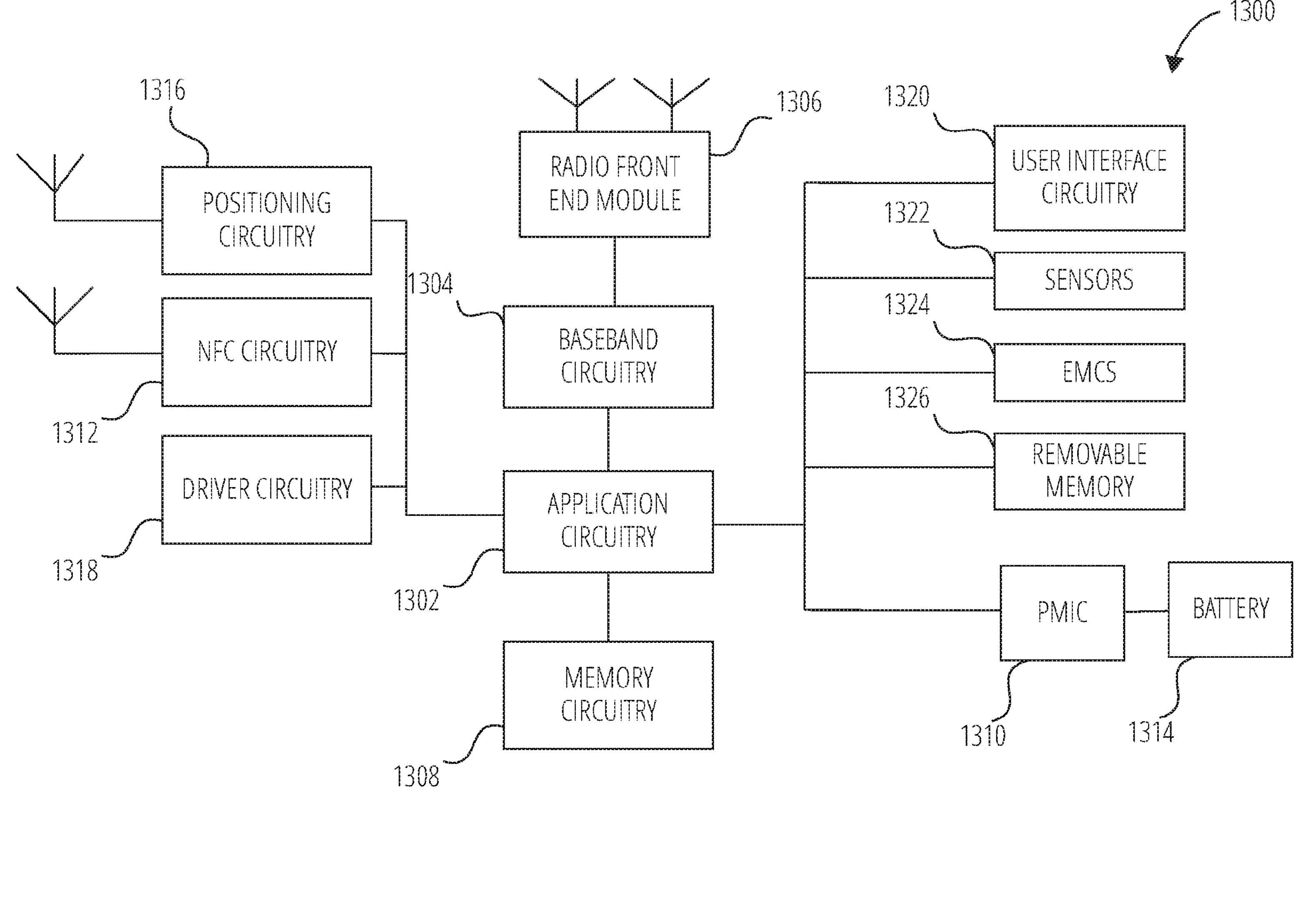
FIG. 13 illustrates a platform in accordance with one embodiment.

FIG. 13 illustrates an example of a platform 1300 in accordance with various embodiments. In embodiments, the computer platform 1300 may be suitable for use as UEs, application servers, and/or any other element/device discussed herein. The platform 1300 may include any combinations of the components shown in the example. The components of platform 1300 may be implemented as integrated circuits (ICs), portions thereof, discrete electronic devices, or other modules, logic, hardware, software, firmware, or a combination thereof adapted in the computer platform 1300, or as components otherwise incorporated within a chassis of a larger system. The block diagram of FIG. 13 is intended to show a high level view of components of the computer platform 1300. However, some of the components shown may be omitted, additional components may be present, and different arrangement of the components shown may occur in other implementations.

Application circuitry 1302 includes circuitry such as, but not limited to one or more processors (or processor cores), cache memory, and one or more of LDOs, interrupt controllers, serial interfaces such as SPI, $I^2C$ or universal programmable serial interface module, RTC, timer-counters including interval and watchdog timers, general purpose IO, memory card controllers such as SD MMC or similar, USB interfaces, MIPI interfaces, and JTAG test access ports. The processors (or cores) of the application circuitry 1302 may be coupled with or may include memory/storage elements and may be configured to execute instructions stored in the memory/storage to enable various applications or operating systems to run on the platform 1300. In some implementations, the memory/storage elements may be on-chip memory circuitry, which may include any suitable volatile and/or non-volatile memory, such as DRAM, SRAM, EPROM, EEPROM, Flash memory, solid-state memory, and/or any other type of memory device technology, such as those discussed herein.

The processor(s) of application circuitry 1302 may include, for example, one or more processor cores, one or more application processors, one or more GPUs, one or more RISC processors, one or more ARM processors, one or more CISC processors, one or more DSP, one or more FPGAs, one or more PLDs, one or more ASICs, one or more microprocessors or controllers, a multithreaded processor, an ultra-low voltage processor, an embedded processor, some other known processing element, or any suitable combination thereof. In some embodiments, the application circuitry 1302 may comprise, or may be, a special-purpose processor/controller to operate according to the various embodiments herein.

As examples, the processor(s) of application circuitry 1302 may include an Intel® Architecture Core™ based processor, such as a Quark™, an Atom™, an i3, an i5, an i7, or an MCU-class processor, or another such processor available from Intel® Corporation. The processors of the application circuitry 1302 may also be one or more of Advanced Micro Devices (AMD) Ryzen® processor(s) or Accelerated Processing Units (APUs); AS-A9 processor(s) from Apple® Inc., Snapdragon™ processor(s) from Qualcomm® Technologies, Inc., Texas Instruments, Inc.® Open Multimedia Applications Platform (OMAP)™ processor(s); a MIPS-based design from MIPS Technologies, Inc. such as MIPS Warrior M-class, Warrior I-class, and Warrior P-class processors; an ARM-based design licensed from ARM Holdings, Ltd., such as the ARM Cortex-A, Cortex-R, and Cortex-M family of processors; or the like in some implementations, the application circuitry 1302 may be a part of a system on a chip (SoC) in which the application circuitry 1302 and other components are formed into a single integrated circuit, or a single package, such as the Edison™ or Galileo™ SoC boards from Intel® Corporation.

Additionally or alternatively, application circuitry 1302 may include circuitry such as, but not limited to, one or more a field-programmable devices (FPDs) such as FPGAs and the like; programmable logic devices (PLDs) such as complex PLDs (CPLDs), high-capacity PLDs (HCPLDs), and the like; ASICs such as structured ASICs and the like; programmable SoCs (PSoCs); and the like. In such embodiments, the circuitry of application circuitry 1302 may comprise logic blocks or logic fabric, and other interconnected resources that may be programmed to perform various functions, such as the procedures, methods, functions, etc. of the various embodiments discussed herein. In such embodiments, the circuitry of application circuitry 1302 may include memory cells (e.g., erasable programmable read-only memory (EPROM), electrically erasable programmable read-only memory (EEPROM), flash memory, static memory (e.g., static random access memory (SRAM), anti-fuses, etc.)) used to store logic blocks, logic fabric, data, etc. in look-up tables (LUTs) and the like.

The baseband circuitry 1304 may be implemented, for example, as a solder-down substrate including one or more integrated circuits, a single packaged integrated circuit soldered to a main circuit board or a multi-chip module containing two or more integrated circuits.

The radio front end module 1306 may comprise a millimeter wave (mmWave) radio front end module (RFEM) and one or more sub-mmWave radio frequency integrated circuits (RFICs). In some implementations, the one or more sub-mmWave RFICs may be physically separated from the mmWave RFEM. The RFICs may include connections to one or more antennas or antenna arrays, and the RFEM may be connected to multiple antennas. In alternative implementations, both mmWave and sub-mmWave radio functions may be implemented in the same physical radio front end module 1306, which incorporates both mmWave antennas and sub-mmWave.

The memory circuitry 1308 may include any number and type of memory devices used to provide for a given amount of system memory. As examples, the memory circuitry 1308 may include one or more of volatile memory including random access memory (RAM), dynamic RAM (DRAM) and/or synchronous dynamic RAM (SD RAM), and non-volatile memory (NVM) including high-speed electrically erasable memory (commonly referred to as Flash memory), phase change random access memory (PRAM), magnetoresistive random access memory (MRAM), etc. The memory circuitry 1308 may be developed in accordance with a Joint Electron Devices Engineering Council (JEDEC) low power double data rate (LPDDR)-based design, such as LPDDR2, LPDDR3, LPDDR4, or the like. Memory circuitry 1308 may be implemented as one or more of solder down packaged integrated circuits, single die package (SDP), dual die package (DDP) or quad die package (Q17P), socketed memory modules, dual inline memory modules (DIMMs) including microDIMMs or MiniDIMMs, and/or soldered onto a motherboard via a ball grid array (BGA), In low power implementations, the memory circuitry 1308 maybe on-die memory or registers associated with the application circuitry 1302. To provide for persistent storage of information such as data, applications, operating systems and so forth, memory circuitry 1308 may include one or more mass storage devices, which may include, inter alia, a solid state disk drive (SSDD), hard disk drive (HDD), a microHDD, resistance change memories, phase change memories, holographic memories, or chemical memories, among others. For example, the computer platform 1300 may incorporate the three-dimensional (3D) cross-point (XPOINT) memories from Intel® and Micron®.

The removable memory 1326 may include devices, circuitry, enclosures/housings, ports or receptacles, etc. used to couple portable data storage devices with the platform 1300. These portable data storage devices may be used for mass storage purposes, and may include, for example, flash memory cards (e.g., Secure Digital (SD) cards, microSD cards, xD picture cards, and the like), and USB flash drives, optical discs, external HDDs, and the like.

The platform 1300 may also include interface circuitry (not shown) that is used to connect external devices with the platform 1300. The external devices connected to the platform 1300 via the interface circuitry include sensors 1322 and electro-mechanical components (shown as EMCs 1324), as well as removable memory devices coupled to removable memory 1326.

The sensors 1322 include devices, modules, or subsystems whose purpose is to detect events or changes in its environment and send the information (sensor data) about the detected events to some other a device, module, subsystem, etc. Examples of such sensors include, inter alia, inertia measurement units (IMUS) comprising accelerometers, gyroscopes, and/or magnetometers; microelectromechanical systems (MEMS) or nanoelectromechanical systems (NEMS) comprising 3-axis accelerometers, 3-axis gyroscopes, and/or magnetometers; level sensors; flow sensors; temperature sensors (e.g., thermistors); pressure sensors; barometric pressure sensors; gravimeters; altimeters; image capture devices (e.g., cameras or lensless apertures); light detection and ranging (LiDAR) sensors; proximity sensors (e.g., infrared radiation detector and the like), depth sensors, ambient light sensors, ultrasonic transceivers; microphones or other like audio capture devices; etc.

EMCs 1324 include devices, modules, or subsystems whose purpose is to enable platform 1300 to change its state, position, and/or orientation, or move or control a mechanism or (sub)system. Additionally, EMCs 1324 may be configured to generate and send messages/signaling to other components of the platform 1300 to indicate a current state of the EMCs 1324. Examples of the EMCs 1324 include one or more power switches, relays including electromechanical relays (EMRs) and/or solid state relays (SSRs), actuators (e.g., valve actuators, etc.), an audible sound generator, a visual warning device, motors (e.g., DC motors, stepper motors, etc.), wheels, thrusters, propellers, claws, clamps, hooks, and/or other like electro-mechanical components. In embodiments, platform 1300 is configured to operate one or more EMCs 1324 based on one or more captured events and/or instructions or control signals received from a service provider and/or various clients. In some implementations, the interface circuitry may connect the platform 1300 with positioning circuitry 1316. The positioning circuitry 1316 includes circuitry to receive and decode signals transmitted/broadcasted by a positioning network of a GNSS. Examples of navigation satellite constellations (or GNSS) include United States' GPS, Russia's GLONASS, the European Union's Galileo system, China's BeiDou Navigation Satellite System, a regional navigation system or GNSS augmentation system (e.g., NAVIC), Japan's QZSS, France's DORIS, etc.), or the like. The positioning circuitry 1316 comprises various hardware elements (e.g., including hardware devices such as switches, filters, amplifiers, antenna elements, and the like to facilitate OTA communications) to communicate with components of a positioning network, such as navigation satellite constellation nodes. In some embodiments, the positioning circuitry 1316 may include a Micro-PNT IC that uses a master timing clock to perform position tracking/estimation without GNSS assistance. The positioning circuitry 1316 may also be part of, or interact with, the baseband circuitry 1304 and/or radio front end module 1306 to communicate with the nodes and components of the positioning network. The positioning circuitry 1316 may also provide position data and/or time data to the application circuitry 1302, which may use the data to synchronize operations with various infrastructure (e.g., radio base stations), for turn-by-turn navigation applications, or the like.

In some implementations, the interface circuitry may connect the platform 1300 with Near-Field Communication circuitry (shown as NFC circuitry 1312). The NFC circuitry 1312 is configured to provide contactless, short-range communications based on radio frequency identification (RFID) standards, wherein magnetic field induction is used to enable communication between NFC circuitry 1312 and NFC-enabled devices external to the platform 1300 (e.g., an "NFC touchpoint"). NFC circuitry 1312 comprises an NFC controller coupled with an antenna element and a processor coupled with the NFC controller. The NFC controller may be a chip/IC providing NFC functionalities to the NFC circuitry 1312 by executing NFC controller firmware and an NFC stack The NFC stack may be executed by the processor to control the NFC controller, and the NFC controller firmware may be executed by the NFC controller to control the antenna element to emit short-range RF signals. The RE signals may power a passive NFC tag (e.g., a microchip embedded in a sticker or wristband) to transmit stored data to the NFC circuitry 1312, or initiate data transfer between the NFC circuitry 1312 and another active NFC device (e.g., a smartphone or an NFC-enabled POS terminal) that is proximate to the platform 1300.

The driver circuitry 1318 may include software and hardware elements that operate to control particular devices that are embedded in the platform 1300, attached to the platform 1300, or otherwise communicatively coupled with the platform 1300. The driver circuitry 1318 may include individual drivers allowing other components of the platform 1300 to interact with or control various input/output (I/O) devices that may be present within, or connected to, the platform 1300. For example, driver circuitry 1318 may include a display driver to control and allow access to a display device, a touchscreen driver to control and allow access to a touchscreen interface of the platform 1300, sensor drivers to obtain sensor readings of sensors 1322 and control and allow access to sensors 1322, EMC drivers to obtain actuator positions of the EMCs 1324 and/or control and allow access to the EMCs 1324, a camera driver to control and allow access to an embedded image capture device, audio drivers to control and allow access to one or more audio devices.

The power management integrated circuitry (shown as PMIC 1310) (also referred to as "power management circuitry") may manage power provided to various components of the platform 1300. In particular, with respect to the baseband circuitry 1304, the PMIC 1310 may control power-source selection, voltage scaling, battery charging, or DC-to-DC conversion. The PMIC 1310 may often be included when the platform 1300 is capable of being powered by a battery 1314, for example, when the device is included in a UE.

In some embodiments, the PMIC 1310 may control, or otherwise be part of, various power saving mechanisms of the platform 1300. For example, if the platform 1300 is in an RRC_Connected state, where it is still connected to the RAN node as it expects to receive traffic shortly, then it may enter a state known as Discontinuous Reception Mode (DRX) after a period of inactivity. During this state, the platform 1300 may power down for brief intervals of time and thus save power. If there is no data traffic activity for an extended period of time, then the platform 1300 may transition off to an RRC_Idle state, where it disconnects from the network and does not perform operations such as channel quality feedback, handover, etc. The platform 1300 goes into a very low power state and it performs paging where again it periodically wakes up to listen to the network and then powers down again. The platform 1300 may not receive data in this state; in order to receive data, it must transition back to RRC_Connected state. An additional power saving mode may allow a device to be unavailable to the network for periods longer than a paging interval (ranging from seconds to a few hours). During this time, the device is totally unreachable to the network and may power down completely. Any data sent during this time incurs a large delay and it is assumed the delay is acceptable.

A battery 1314 may power the platform 1300, although in some examples the platform 1300 may be mounted deployed in a fixed location, and may have a power supply coupled to an electrical grid. The battery 1314 may be a lithium ion battery, a metal-air battery, such as a zinc-air battery, an aluminum-air battery, a lithium-air battery, and the like. In some implementations, such as in V2X applications, the battery 1314 may be a typical lead-acid automotive battery.

In some implementations, the battery 1314 may be a "smart battery," which includes or is coupled with a Battery Management System (BMS) or battery monitoring integrated circuitry. The BMS may be included in the platform 1300 to track the state of charge (SoCh) of the battery 1314. The BMS may be used to monitor other parameters of the battery 1314 to provide failure predictions, such as the state of health (SoH) and the state of function (SoF) of the battery 1314. The BMS may communicate the information of the battery 1314 to the application circuitry 1302 or other components of the platform 1300. The BMS may also include an analog-to-digital (ADC) convertor that allows the application circuitry 1302 to directly monitor the voltage of the battery 1314 or the current flow from the battery 1314. The battery parameters may be used to determine actions that the platform 1300 may perform, such as transmission frequency, network operation, sensing frequency, and the like.

A power block, or other power supply coupled to an electrical grid may be coupled with the BMS to charge the battery 1314. In some examples, the power block may be replaced with a wireless power receiver to obtain the power wirelessly, for example, through a loop antenna in the computer platform 1300. In these examples, a wireless battery charging circuit may be included in the BMS. The specific charging circuits chosen may depend on the size of the battery 1314, and thus, the current required. The charging may be performed using the Airfuel standard promulgated by the Airfuel Alliance, the Qi wireless charging standard promulgated by the Wireless Power Consortium, or the Rezence charging standard promulgated by the Alliance for Wireless Power, among others.

User interface circuitry 1320 includes various input/output (I/O) devices present within, or connected to, the platform 1300, and includes one or more user interfaces designed to enable user interaction with the platform 1300 and/or peripheral component interfaces designed to enable peripheral component interaction with the platform 1300. The user interface circuitry 1320 includes input device circuitry and output device circuitry. Input device circuitry includes any physical or virtual means for accepting an input including, inter alia, one or more physical or virtual buttons (e.g., a reset button), a physical keyboard, keypad, mouse, touchpad, touchscreen, microphones, scanner, headset, and/or the like. The output device circuitry includes any physical or virtual means for showing information or otherwise conveying information, such as sensor readings, actuator position(s), or other like information. Output device circuitry may include any number and/or combinations of audio or visual display, including, inter alia, one or more simple visual outputs/indicators such as binary status indicators (e.g., light emitting diodes (LEDs)) and multi-character visual outputs, or more complex outputs such as display devices or touchscreens (e.g., Liquid Chrystal Displays (LCD), LED displays, quantum dot displays, projectors, etc.), with the output of characters, graphics, multimedia objects, and the like being generated or produced from the operation of the platform 1300. The output device circuitry may also include speakers or other audio emitting devices, printer(s), and/or the like. In some embodiments, the sensors 1322 may be used as the input device circuitry (e.g., an image capture device, motion capture device, or the like) and one or more EMCs may be used as the output device circuitry (e.g., an actuator to provide haptic feedback or the like). In another example, NFC circuitry comprising an NFC controller coupled with an antenna element and a processing device may be included to read electronic tags and/or connect with another NFC-enabled device. Peripheral component interfaces may include, but are not limited to, a non-volatile memory port, a USB port, an audio jack, a power supply interface, etc.

Although not shown, the components of platform 1300 may communicate with one another using a suitable bus or interconnect (IX) technology, which may include any number of technologies, including ISA, EISA, PCI, PCix, PCie, a Time-Trigger Protocol (TTP) system, a FlexRay system, or any number of other technologies. The bus/IX may be a proprietary bus/TX, for example, used in a SoC based system. Other bus/IX systems may be included, such as an $I^2C$ interface, an SPI interface, point-to-point interfaces, and a power bus, among others.

Figure 14:
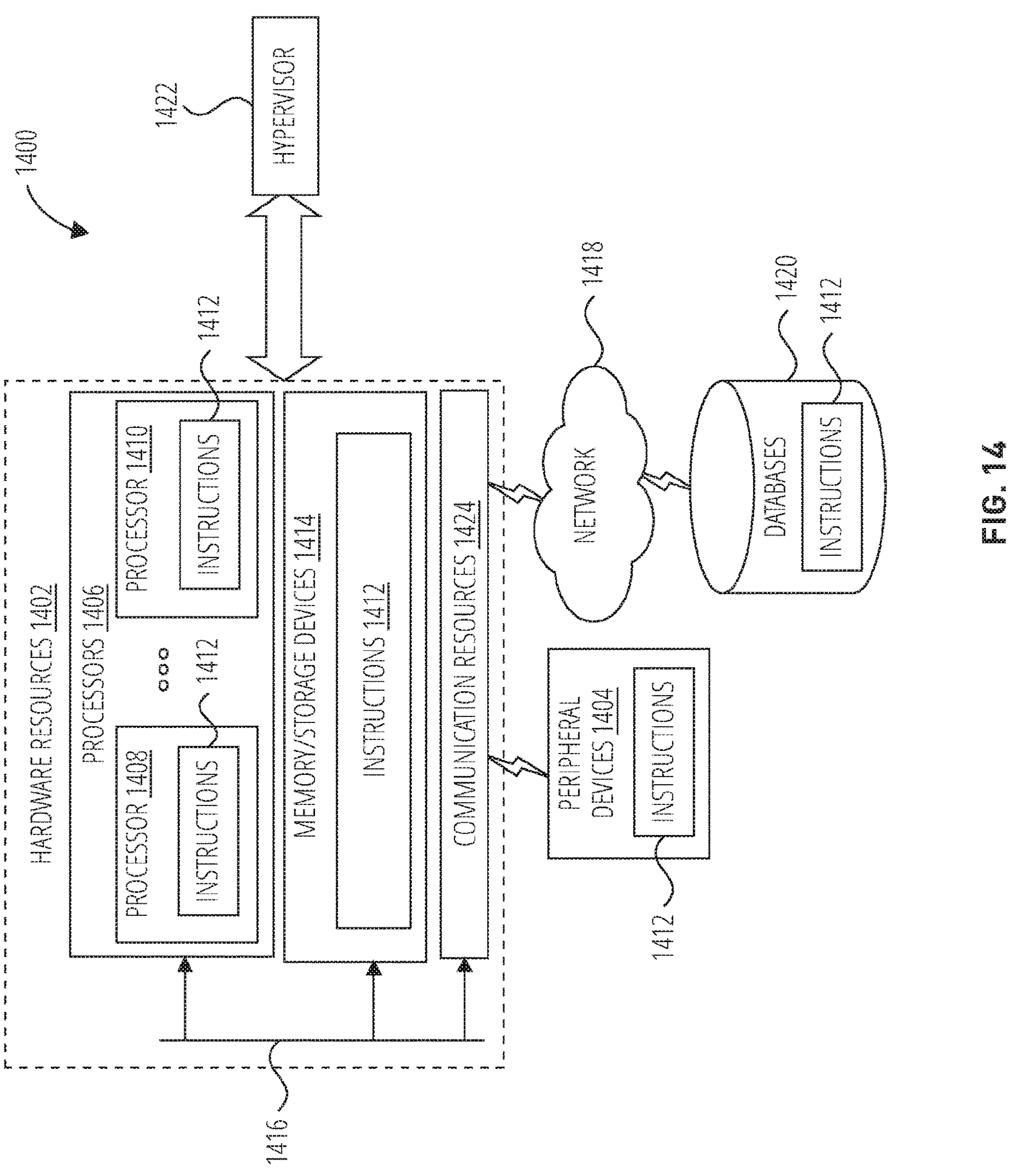
FIG. 14 illustrates components in accordance with one embodiment.

FIG. 14 is a block diagram illustrating components 1400, according to some example embodiments, able to read instructions from a machine-readable or computer-readable medium (e.g., a non-transitory machine-readable storage medium) and perform any one or more of the methodologies discussed herein. Specifically, FIG. 14 shows a diagrammatic representation of hardware resources 1402 including one or more processors 1406 (or processor cores), one or more memory/storage devices 1414, and one or more communication resources 1424, each of which may be communicatively coupled via a bus 1416. For embodiments where node virtualization (e.g., NFV) is utilized, a hypervisor 1422 may be executed to provide an execution environment for one or more network slices/sub-slices to utilize the hardware resources 1402.

The processors 1406 (e.g., a central processing unit (CPU), a reduced instruction set computing (RISC) processor, a complex instruction set computing (CISC) processor, a graphics processing unit (GPU), a digital signal processor (DSP) such as a baseband processor, an application specific integrated circuit (ASIC), a radio-frequency integrated circuit (RFIC), another processor, or any suitable combination thereof) may include, for example, a processor 1408 and a processor 1410.

The memory/storage devices 1414 may include main memory, disk storage, or any suitable combination thereof. The memory/storage devices 1414 may include, but are not limited to any type of volatile or non-volatile memory such as dynamic random access memory (DRAM), static random-access memory (SRAM), erasable programmable read-only memory (EPROM), electrically erasable programmable read-only memory (EEPROM), Flash memory, solid-state storage, etc.

The communication resources 1424 may include interconnection or network interface components or other suitable devices to communicate with one or more peripheral devices 1404 or one or more databases 1420 via a network 1418. For example, the communication resources 1424 may include wired communication components (e.g., for coupling via a Universal Serial Bus (USB)), cellular communication components, NFC components, Bluetooth® components (e.g., Bluetooth® Low Energy), Wi-Fi® components, and other communication components.

Instructions 1412 may comprise software, a program, an application, an applet, an app, or other executable code for causing at least any of the processors 1406 to perform any one or more of the methodologies discussed herein. The instructions 1412 may reside, completely or partially, within at least one of the processors 1406 (e.g., within the processor's cache memory), the memory/storage devices 1414, or any suitable combination thereof. Furthermore, any portion of the instructions 1412 may be transferred to the hardware resources 1402 from any combination of the peripheral devices 1404 or the databases 1420. Accordingly, the memory of the processors 1406, the memory/storage devices 1414, the peripheral devices 1404, and the databases 1420 are examples of computer-readable and machine-readable media.

For one or more embodiments, at least one of the components set forth in one or more of the preceding figures may be configured to perform one or more operations, techniques, processes, and/or methods as set forth in the Example Section below. For example, the baseband circuitry as described above in connection with one or more of the preceding figures may be configured to operate in accordance with one or more of the examples set forth below. For another example, circuitry associated with a UE, base station, network element, etc. as described above in connection with one or more of the preceding figures may be configured to operate in accordance with one or more of the examples set forth below in the example section.

EXAMPLE SECTION

The following examples pertain to further embodiments.

Example 1 is a method for backhaul radio link control (RLC) channel establishment using a backhaul adaptation protocol (BAP) in a wireless network. The method includes generating a BAP protocol data unit (PDU) comprising a BAP header including a destination field, a path field, and a bit configured to indicate whether the destination field comprises a unicast address or a multicast address; generating a multicast radio resource control (RRC) reconfiguration message comprising the BAP PDU; and in response to sending the multicast RRC reconfiguration message, processing unicast RRC reconfiguration complete messages received from a plurality of Integrated Access and Backhaul (IAB) nodes using the BAP.

Example 2 includes the method of Example 1, further comprising setting the bit indicate to the plurality of IAB nodes to treat an address in the destination field as the multicast address for a path identifier in the path field of the BAP header.

Example 3 includes the method of Example 2, further comprising: grouping the plurality of IAB nodes into a subnet corresponding to a subnet prefix; and including the subnet prefix in the destination field of the BAP header.

Example 4 includes the method of Example 1, further comprising: generating the BAP PDU in response to a PDU session setup request from a core network; in response to processing the unicast RRC reconfiguration complete messages from the plurality of IAB nodes, sending a unicast RRC reconfiguration message to a user equipment (UE) in communication with one of the plurality of IAB nodes; processing an RRC reconfiguration complete message from the UE; and in response to the RRC reconfiguration complete message from the UE, sending a PDU session setup complete message to the core network.

Example 5 includes the method of Example 4, wherein the plurality of IAB nodes comprises a first IAB node for a priority link in a first backhaul path between the UE and the core network and a second IAB node for a backup link in a second backhaul path between the UE and the core network.

Example 6 is a method for backhaul radio link control (RLC) channel establishment using configuration forwarding in a wireless network. The method includes: generating a radio resource control (RRC) reconfiguration message comprising an information element (IF) including a forward to field, wherein the forward to field comprises a list of addresses for sequential hops between a plurality of Integrated Access and Backhaul (IAB) nodes; and sending the RRC reconfiguration message to a first IAB node in the plurality of IAB nodes for forwarding to a second IAB node in the plurality of IAB nodes.

Example 7 includes the method of Example 6, further comprising receiving an RRC reconfiguration complete message from each node in the plurality of IAB nodes.

Example 8 includes the method of Example 6, further comprising receiving an RRC reconfiguration complete message from an end node in the plurality of IAB nodes, wherein the end node is in communication with a user equipment (UE) or detected a failure along a path to establish a connection with the UE.

Example 9 includes the method of Example 8, further comprising, based on the failure, reseeding the RRC reconfiguration message to failed IAB node in the plurality of IAB nodes.

Example 10 includes the method of Example 6, further comprising attempting to reseed the RRC reconfiguration message up to a threshold number of times until, based on receiving one or more RRC reconfiguration complete messages, the backhaul RLC channel establishment is complete.

Example 11 includes the method of Example 6, further comprising grouping the plurality of IAB nodes into a subnet corresponding to a subnet prefix.

Example 12 includes the method of Example 6, wherein the plurality of IAB nodes are to establish a priority link in a first path between the UE and the core network and a backup link in a second path between the UE and the core network.

Example 13 includes the method of Example 12, wherein the RRC reconfiguration message comprises a first RRC reconfiguration message corresponding to the first backhaul path including the priority link, the method further comprising: generating a second RRC reconfiguration message comprising the IE including the forward to field, wherein the forward to field includes an address for a third IAB node for the backup link; and sending the second RRC reconfiguration message to the first IAB node in the plurality of IAB nodes for forwarding, either directly or indirectly, to the third IAB node in the plurality of IAB nodes.

Example 14 includes the method of Example 13, further comprising receiving an RRC reconfiguration complete message corresponding to the first backhaul path before sending the second RRC reconfiguration message.

Example 15 includes the method of Example 13, further comprising simultaneously transmitting the first RRC reconfiguration message and the second RRC reconfiguration message to establish both the priority link and the backup link.

Example 16 includes the method of Example 13, further comprising processing a media access control (MAC) control element (CE) comprising an indication to activate the backup link.

Example 17 includes the method of Example 16, wherein the MAC CE comprises an activation/deactivation field and a path identifier (ID) field, and wherein the activation/deactivation field indicates whether the second path corresponding to the backup link identified by the path ID field is activated or deactivated.

Example 18 includes the method of Example 13, further comprising processing downlink control information (DCI) with a DCI format configured for exchange between the plurality of IAB nodes, the DCI format used for transmission of a group of IAB commands for inter-IAB communications, the group of IAB commands including a command to activate the backup link.

Example 19 is a method for backhaul radio link control (RLC) channel establishment using radio resource configuration (RRC) reconfiguration with multicasting. The method includes: configuring an Integrated. Access and Backhaul (IAB) donor node and one or more child IAB nodes as a subnet; and generating a reconfiguration message to send to the subnet, the reconfiguration message comprising an information element (IE) for the subnet including configuration settings for the backhaul RLC channel establishment, the IE identifying the subnet to indicate to the IAB donor node and the one or more child IAB nodes with Internet Protocol P addresses associated with the subnet to apply the configuration settings.

Example 20 includes the method of Example 19, wherein the configuration settings are for a one-to-one (1-1) or a many-to-one (many-1) mapping configuration of the RLC for the IAB.

Example 21 may include an apparatus comprising means to perform one or more elements of a method described in or related to any of the above Examples, or any other method or process described herein.

Example 22 may include one or more non-transitory computer-readable media comprising instructions to cause an electronic device, upon execution of the instructions by one or more processors of the electronic device, to perform one or more elements of a method described in or related to any of the above Examples, or any other method or process described herein.

Example 23 may include an apparatus comprising logic, modules, or circuitry to perform one or more elements of a method described in or related to any of the above Examples, or any other method or process described herein.

Example 24 may include a method, technique, or process as described in or related to any of the above Examples, or portions or parts thereof.

Example 25 may include an apparatus comprising: one or more processors and one or more computer-readable media comprising instructions that, when executed by the one or more processors, cause the one or more processors to perform the method, techniques, or process as described in or related to any of the above Examples, or portions thereof.

Example 26 may include a signal as described in or related to any of the above Examples, or portions or parts thereof.

Example 27 may include a datagram, packet, frame, segment, protocol data unit (PDU), or message as described in or related to any of the above Examples, or portions or parts thereof, or otherwise described in the present disclosure.

Example 28 may include a signal encoded with data as described in or related to any of the above Examples, or portions or parts thereof, or otherwise described in the present disclosure.

Example 29 may include a signal encoded with a datagram, packet, frame, segment, PDU, or message as described in or related to any of the above Examples, or portions or parts thereof, or otherwise described in the present disclosure.

Example 30 may include an electromagnetic signal carrying computer-readable instructions, wherein execution of the computer-readable instructions by one or more processors is to cause the one or more processors to perform the method, techniques, or process as described in or related to any of the above Examples, or portions thereof.

Example 31 may include a computer program comprising instructions, wherein execution of the program by a processing element is to cause the processing element to carry out the method, techniques, or process as described in or related to any of the above Examples, or portions thereof.

Example 32 may include a signal in a wireless network as shown and described herein.

Example 33 may include a method of communicating in a wireless network as shown and described herein.

Example 34 may include a system for providing wireless communication as shown and described herein.

Example 35 may include a device for providing wireless communication as shown and described herein.

Any of the above described examples may be combined with any other example (or combination of examples), unless explicitly stated otherwise. The foregoing description of one or more implementations provides illustration and description, but is not intended to be exhaustive or to limit the scope of embodiments to the precise form disclosed. Modifications and variations are possible in light of the above teachings or may be acquired from practice of various embodiments.

Embodiments and implementations of the systems and methods described herein may include various operations, which may be embodied in machine-executable instructions to be executed by a computer system. A computer system may include one or more general-purpose or special-purpose computers (or other electronic devices). The computer system may include hardware components that include specific logic for performing the operations or may include a combination of hardware, software, and/or firmware.

It should be recognized that the systems described herein include descriptions of specific embodiments. These embodiments can be combined into single systems, partially combined into other systems, split into multiple systems or divided or combined in other ways. In addition, it is contemplated that parameters, attributes, aspects, etc. of one embodiment can be used in another embodiment. The parameters, attributes, aspects, etc. are merely described in one or more embodiments for clarity, and it is recognized that the parameters, attributes, aspects, etc. can be combined with or substituted for parameters, attributes, aspects, etc. of another embodiment unless specifically disclaimed herein.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

Although the foregoing has been described in some detail for purposes of clarity, it will be apparent that certain changes and modifications may be made without departing from the principles thereof. It should be noted that there are many alternative ways of implementing both the processes and apparatuses described herein. Accordingly, the present embodiments are to be considered illustrative and not restrictive, and the description is not to be limited to the details given herein, but may be modified within the scope and equivalents of the appended claims.

The invention claimed is:

1. A method for backhaul radio link control (RLC) channel establishment using a backhaul adaptation protocol (BAP) in a wireless network, the method comprising:

- generating, at a donor Integrated Access and Backhaul (IAB) node, a BAP protocol data unit (PDU) comprising a BAP header including a first field comprising a destination field, a second field comprising a path field, and a third field comprising a bit configured to indicate whether the destination field comprises a unicast address or a multicast address;
- generating, at the donor IAB node, a multicast radio resource control (RRC) reconfiguration message comprising the BAP PDU;
- in response to sending the multicast RRC reconfiguration message, processing, at the donor IAB node, a separate unicast RRC reconfiguration complete message received from each of a plurality of IAB nodes using the BAP;
- in response to processing the separate unicast RRC reconfiguration complete message received from each of the plurality of IAB nodes, sending a unicast RRC reconfiguration message to a user equipment (UE) in communication with one of the plurality of IAB nodes;

processing an RRC reconfiguration complete message from the UE; and in response to the RRC reconfiguration complete message from the UE, sending, from the IAB donor node, a PDU session setup complete message to a core network.

2. The method of claim 1, further comprising setting the bit to indicate to the plurality of IAB nodes to treat an address in the destination field as the multicast address for a path identifier in the path field of the BAP header.

3. The method of claim 2, further comprising:

grouping the plurality of IAB nodes into a subnet corresponding to a subnet prefix; and including the subnet prefix in the destination field of the BAP header.

4. The method of claim 1, further comprising:

generating the BAP PDU in response to a PDU session setup request from the core network.

5. The method of claim 4, wherein the plurality of IAB nodes comprises a first IAB node for a priority link in a first backhaul path between the UE and the core network and a second IAB node for a backup link in a second backhaul path between the UE and the core network.

6. A method for backhaul radio link control (RLC) channel establishment using radio resource configuration (RRC) reconfiguration with multicasting, the method comprising:

configuring an Integrated Access and Backhaul (IAB) donor node and one or more child IAB nodes as a subnet;

generating, at the IAB donor node, a multicast reconfiguration message to send to the one or more child IAB nodes of the subnet, the multicast reconfiguration message comprising an information element (IE) for the subnet including configuration settings for the backhaul RLC channel establishment, the IE identifying the subnet to indicate to the IAB donor node and the one or more child IAB nodes with Internet Protocol (IP) addresses associated with the subnet to apply the configuration settings;

in response to sending the multicast reconfiguration message, processing a separate unicast reconfiguration complete message received from each of the one or more child IAB nodes of the subnet;

in response to IAB node failure at an end node of the one or more child IAB nodes, receiving, from the end node of the one or more child IAB nodes, a unicast reconfiguration complete message, wherein the unicast reconfiguration complete message comprises an identifier (ID) corresponding to the end node; and resending the reconfiguration message to the end node.

7. The method of claim 6, wherein the configuration settings are for a one-to-one (1-1) or a many-to-one (many-1) mapping configuration of the RLC for the IAB.

8. An apparatus comprising:

one or more processors; and one or more non-transitory computer-readable media comprising instructions that, when executed by the one or more processors, cause the one or more processors to perform backhaul radio link control (RLC) channel establishment using a backhaul adaptation protocol (BAP) in a wireless network, the one or more processors configured to:

generate, at a donor Integrated Access and Backhaul (IAB) node, a BAP protocol data unit (PDU) comprising a BAP header including a first field comprising a destination field, a second field comprising a path field, and a third field comprising a bit configured to indicate whether the destination field comprises a unicast address or a multicast address;

generate, at the donor IAB node, a multicast radio resource control (RRC) reconfiguration message comprising the BAP PDU; and in response to sending the multicast RRC reconfiguration message, process, at the donor IAB node, a separate unicast RRC reconfiguration complete message received from each of a plurality of IAB nodes using the BAP;

in response to processing the separate unicast RRC reconfiguration complete message received from each of the plurality of IAB nodes, send a unicast RRC reconfiguration message to a user equipment (UE) in communication with one of the plurality of IAB nodes;

process an RRC reconfiguration complete message from the UE; and in response to the RRC reconfiguration complete message from the UE, send, from the IAB donor node, a PDU session setup complete message to a core network.

9. The apparatus of claim 8, wherein the one or more processors are further configured to set the bit to indicate to the plurality of IAB nodes to treat an address in the destination field as the multicast address for a path identifier in the path field of the BAP header.

10. The apparatus of claim 9, wherein the one or more processors are further configured to:

group the plurality of IAB nodes into a subnet corresponding to a subnet prefix; and include the subnet prefix in the destination field of the BAP header.

11. The apparatus of claim 8, wherein the one or more processors are further configured to:

generate the BAP PDU in response to a PDU session setup request from the core network.

12. The apparatus of claim 11, wherein the plurality of IAB nodes comprises a first IAB node for a priority link in a first backhaul path between the UE and the core network and a second IAB node for a backup link in a second backhaul path between the UE and the core network.

* * * * *